United States Patent
Elam et al.

(10) Patent No.: US 9,917,295 B2
(45) Date of Patent: Mar. 13, 2018

(54) METHODS FOR USING ATOMIC LAYER DEPOSITION TO PRODUCE A FILM FOR SOLID STATE ELECTROLYTES AND PROTECTIVE ELECTRODE COATINGS FOR LITHIUM BATTERIES

(71) Applicant: UChicago Argonne, LLC, Chicago, IL (US)

(72) Inventors: Jeffrey W. Elam, Elmhurst, IL (US); Xiangbo Meng, Naperville, IL (US)

(73) Assignee: UChicago Argonne, LLC, Chicago, IL (US)

(*) Notice: Subject to any disclaimer, the term of this patent is extended or adjusted under 35 U.S.C. 154(b) by 432 days.

(21) Appl. No.: 14/711,504

(22) Filed: May 13, 2015

(65) Prior Publication Data
US 2015/0364747 A1     Dec. 17, 2015

Related U.S. Application Data

(60) Provisional application No. 61/992,763, filed on May 13, 2014.

(51) Int. Cl.
| | | |
|---|---|---|
| *H01M 4/04* | (2006.01) |
| *H01M 10/058* | (2010.01) |
| *H01M 10/0562* | (2010.01) |
| *H01M 4/58* | (2010.01) |
| *H01M 4/136* | (2010.01) |
| *H01M 4/1397* | (2010.01) |

(Continued)

(52) U.S. Cl.
CPC ......... *H01M 4/0426* (2013.01); *H01M 4/136* (2013.01); *H01M 4/1397* (2013.01); *H01M 4/5815* (2013.01); *H01M 10/058* (2013.01); *H01M 10/0562* (2013.01); *H01M 10/052* (2013.01); *H01M 10/0525* (2013.01); *H01M 2220/20* (2013.01); *H01M 2300/0068* (2013.01); *Y02E 60/122* (2013.01)

(58) Field of Classification Search
CPC ............ H01M 4/5815; H01M 4/0421; H01M 4/1397; H01M 10/0525; H01M 10/0562
See application file for complete search history.

(56) References Cited

U.S. PATENT DOCUMENTS

| 9,040,113 B2 * | 5/2015 | Martinson | ............. C23C 16/305 427/74 |
| 2006/0115389 A1 * | 6/2006 | Indech | ................. B01D 53/945 422/168 |

(Continued)

OTHER PUBLICATIONS

Dasgupta, Neil P., et al., "Atomic Layer Deposition of Lead Sulfide Quantum Dots on Nanowire Surfaces". Nano Letters, 2011, 11, 934-940.*

(Continued)

*Primary Examiner* — Bret P Chen
(74) *Attorney, Agent, or Firm* — Foley & Lardner LLP

(57) ABSTRACT

A method for using atomic layer deposition to produce a film configured for use in an anode, cathode, or solid state electrolyte of a lithium-ion battery or a lithium-sulfur battery. The method includes repeating a cycle for a predetermined number of times in an inert atmosphere. The cycle includes exposing a substrate to a first precursor, purging the substrate with inert gas, exposing the substrate to a second precursor, and purging the substrate with inert gas. The film is a metal sulfide.

17 Claims, 23 Drawing Sheets

(51) Int. Cl.
    *H01M 10/0525* (2010.01)
    *H01M 10/052* (2010.01)

(56) References Cited

U.S. PATENT DOCUMENTS

2009/0065042 A1* 3/2009 Reynolds .......... H01M 10/0562
                                                    136/244
2015/0170914 A1* 6/2015 Haukka ............ H01L 21/28264
                                                    438/478

OTHER PUBLICATIONS

Dasgupta, Neil P., et al., "Design of an atomic layer deposition reactor for hydrogen sulfide compatiblity". Review of Scientific Instruments 81, 044102 (2010), pp. 1-6.*

Thimsen, E., "Atomic Layer Deposition of Multicomponent Metal Sulfides Applied to Thin Film Photovoltaics". ECS Transactions, 58 (10) 95-104 (2013).*

Dasgupta, Neil P., et al., "Atomic Layer Deposition of Metal Sulfide Materials". Accounts of Chemical Research, 2015, 48, 341-348.*

Chen, X. et al., "Gallium sulfide thin grown on GaAs(1 0 0) by microwave glow discharge," Journal of Crystal Growth, Mar. 2, 1997, vol. 173, pp. 51-56.

Lazell, M. R. et al., "Deposition of Thin Films of Gallium Sulfide from a Novel Single-Source Precursor, Ga(S2CNMeHex)3, by Low-Pressure Metal-Organic Chemical Vapor Deposition," Chemistry of Materials, Dec. 1, 1999, vol. 11, pp. 3430-3432.

Ohyama, M. et al., "Growth, Optical and Structural Characterization of Layered GaS Films Prepared by Reactive RF Sputtering Method," Japanese Journal of Applied Physics, Jul. 8, 2005, vol. 44, No. 7A, pp. 4780-4783.

Sanz, C. et al., "Influence of the synthesis conditions on gallium sulfide thin films prepared by modulated flux deposition," Journal of Physics D: Applied Physics, Mar. 26, 2009, vol. 42, No. 085106, 6 pages.

Senoh, H. et al., "Gallium (III) sulfide as an active material in lithium secondary batteries," Journal of Power Sources, Feb. 26, 2011, vol. 196, pp. 5631-5636.

Suh, S. & Hoffman, D. M., "Chemical Vapor Deposition of Gallium Sulfide Thin Films," Chemistry of Materials, Aug. 12, 2000, vol. 12, pp. 2794-2797.

Wu, F. et al., "Nanoporous Li2S and Mwcnt-linked Li2S powder cathodes for lithium-sulfur and lithium-ion battery chemistries," Journal of materials Chemistry A, Nov. 12 2013, vol. 2, pp. 6064-6070.

Yang, Y. et al., "High-Capacity Micrometer-Sized Li2S Particles as Cathode Materials for Advanced Rechargeable Lithium-Ion Batteries," Journal of the American Chemical Society, Aug. 21, 2012, vol. 134, pp. 15387-15394.

Yang, Z. et al., "In situ synthesis of lithium sulfide-carbon composites as cathode materials for rechargeable lithium batteries," Journal of Materials Chemistry A, Nov. 20, 2012, vol. 1, pp. 1433-1440.

Zheng, J. et al., "Controlled Nucleation and growth Process of Li2S2/Li2S in Lithium-Sulfur Batteries," Journal of the Electromechanical Society, Sep. 19, 2013, vol. 160, No. 11, pp. A1992-A1996.

* cited by examiner

Figure 1(a)
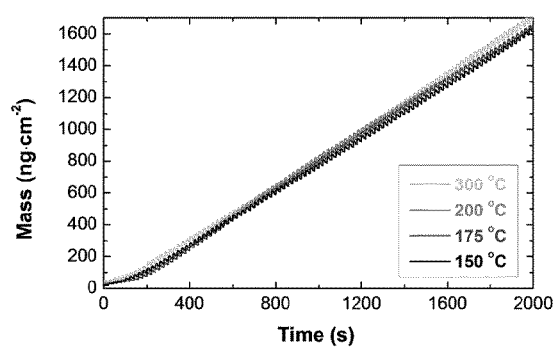
Figure 1(b)
Figure 1(c)
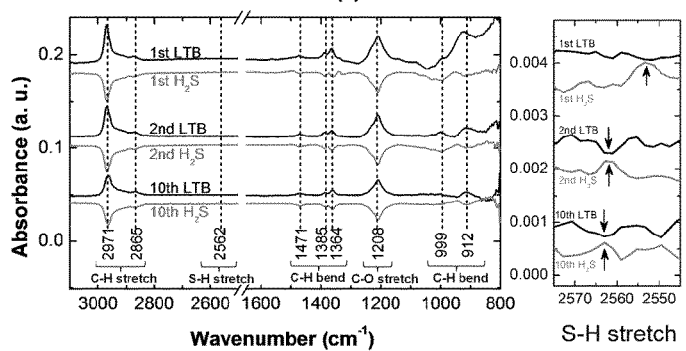
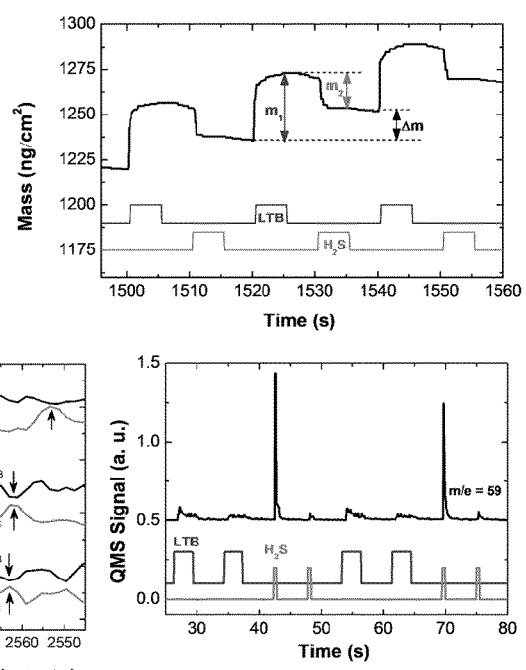
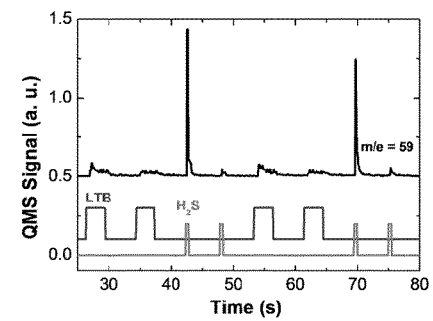
Figure 1(d)

Figure 2(a)
Figure 2(c)
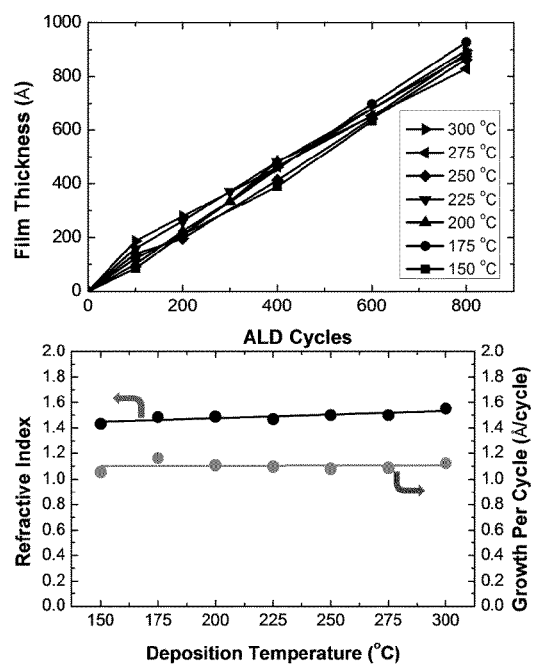
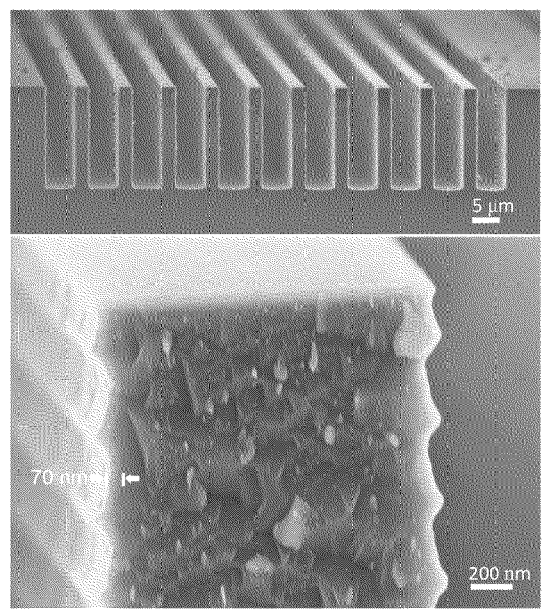
Figure 2(b)
Figure 2(d)

Figure 10(a)                    Figure 10(b)
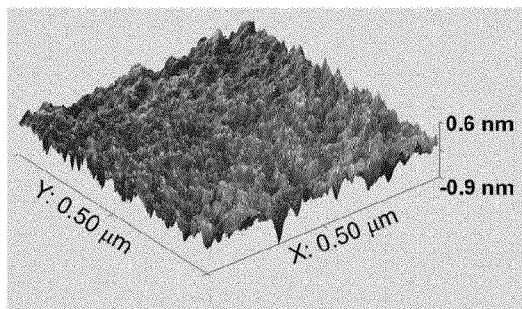 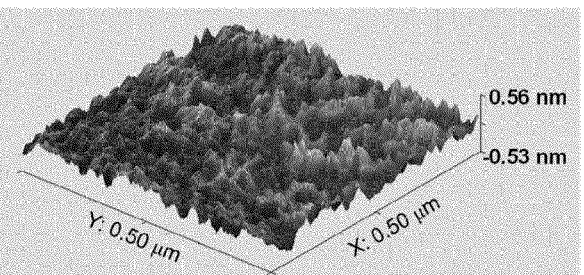
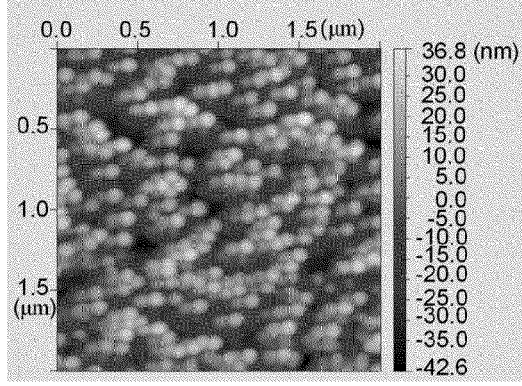 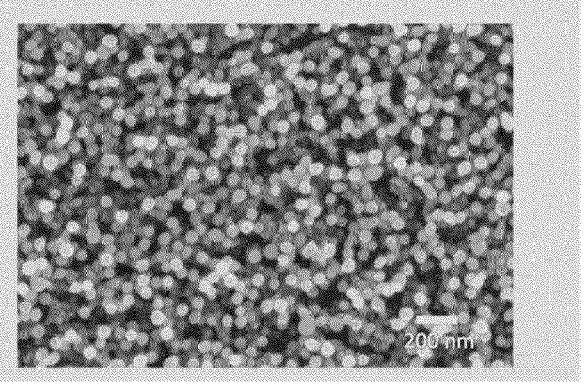
Figure 10(c)                    Figure 10(d)

Figure 14(a)　Figure 14(b)　Figure 14(c)　Figure 14(d)
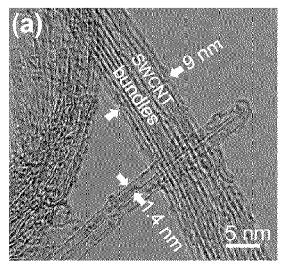 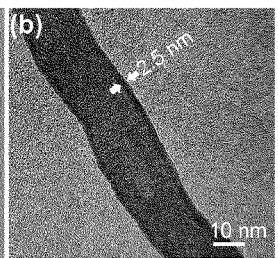 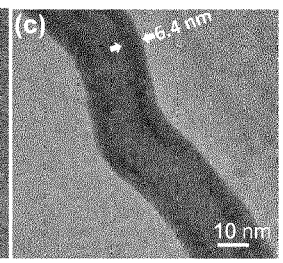 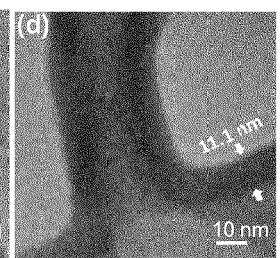
Figure 14(e)　　　　Figure 14(f)　　Figure 14(g)
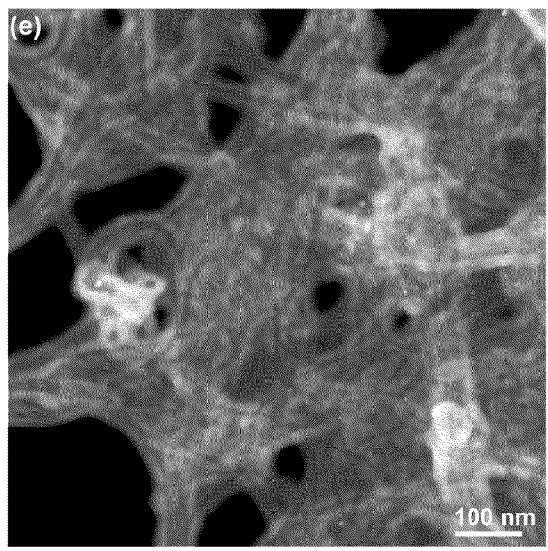 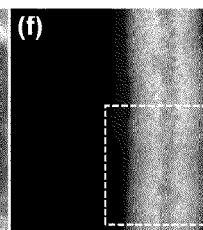 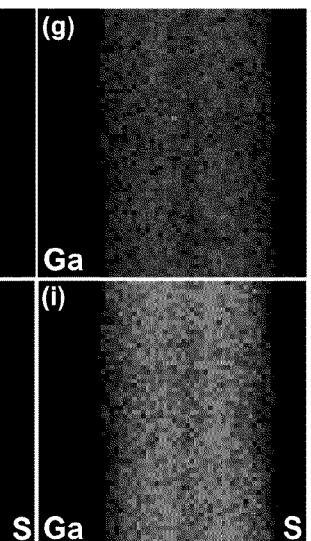
Figure 14(h)　Figure 14(i)

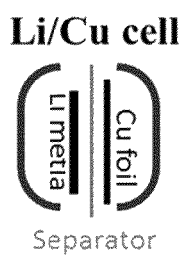
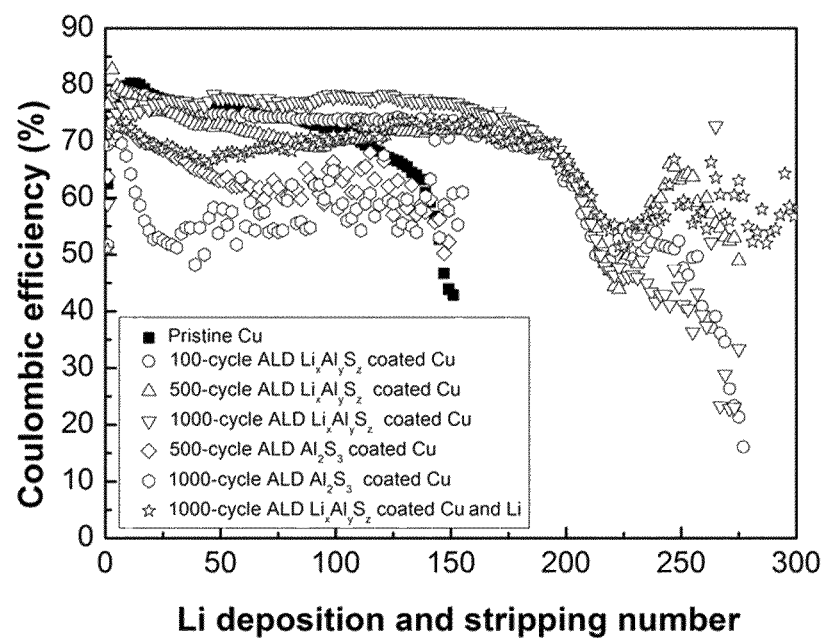
Figure 20

METHODS FOR USING ATOMIC LAYER DEPOSITION TO PRODUCE A FILM FOR SOLID STATE ELECTROLYTES AND PROTECTIVE ELECTRODE COATINGS FOR LITHIUM BATTERIES

CROSS-REFERENCE TO RELATED APPLICATIONS

This application claims the benefit of U.S. Provisional Application No. 61/992,763 filed on May 13, 2014, which is hereby incorporated by reference in its entirety.

STATEMENT OF GOVERNMENT INTEREST

The United States Government claims certain rights in this invention pursuant to Contract No. DE-AC02-06CH11357 between the U.S. Department of Energy and UChicago Argonne, LLC, as operator of Argonne National Laboratories.

FIELD OF THE INVENTION

The present invention relates generally to the field of batteries. More specifically, the present invention relates to a method and materials to be used as solid state electrolytes and protective electrode coatings in lithium batteries such as lithium ion batteries.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

To address the vexing problems of depleting fossil fuel reserves and rising greenhouse gas levels, renewable energy sources such as solar radiation, wind, and waves are undergoing intensive investigation. All of these renewable sources are intermittent, and will require energy storage technologies, such as batteries, to produce a continuous power flow. Electric vehicles (EVs) can also play a role in solving these challenges, but again, substantial improvements in battery performance are required to realize their full potential. Lithium-ion batteries (LIBs) are promising candidates for fulfilling the energy storage requirements of renewable power and EVs. LIBs, consisting of a $LiCoO_2$ cathode and a graphite anode, have dominated the consumer electronics market since their introduction in 1991, primarily due to their superior energy and power density compared to other secondary batteries. However, to meet the demanding requirements for EVs, the specific energy of LIBs must increase by 2-5 times from the current value of 150 Wh/kg. As a consequence, the quest for higher-performance electrode materials with increased power, energy density, lifetime, and safety is ongoing. In particular, nanomaterials are regarded as having great potential to enhance LIB performance as a result of their reduced dimensions. Of the many classes of nanophase materials investigated to date, metal sulfides are relatively unexplored, but show great potential to serve as either electrodes (e.g. MnS, $FeS/FeS_2$, CuS, and ZnS), or lithium-ion conducting solid electrolytes (e.g., $Li_{10}GeP_2S_{12}$) and consequently they are a promising avenue of research.

Lithium sulfur batteries are being considered as an alternative to conventional lithium ion due to the higher theoretical capacity (2567 Wh/kg for Li—S vs. 387 Wh/kg for Li-ion). In addition, sulfur is inexpensive, abundant, and environmentally-friendly. Despite their numerous advantages, daunting technical challenges must be overcome before Li—S batteries can be commercialized, including: (1) poor electrode rechargeability and limited rate capability due to the insulating nature of S and $Li_2S$; (2) rapid capacity fading due to the formation of soluble polysulfides $Li_2S_n$ ($3 \leq n \leq 6$); and (3) a poorly controlled Li/electrolyte interface (i.e., sulfur dissolution into the liquid electrolyte of Li—S batteries).

The lithium metal anode of Li—S batteries has also been identified as a potential risk in practical use due to the well-known Li dendrite growth during cycling which can lead to catastrophic failure. Furthermore, limited reserves of Li resources impose another concern in view of the colossal demands of automotive transportation. A viable solution is substituting S with $Li_2S$ and the latter as the Li source is capable of coupling with many more promising and economic anode materials such as Si and Sn. As a consequence, $Li_2S$ is currently undergoing intensive investigation.

The reductive $Li_2S$ has a capacity of 1166 mA·h/g, four to five times greater than intercalation-based cathodes of LIBs. $Li_2S$ is intrinsically insulating, both electronically and ionically. To compensate for this deficit, conducting materials, such as carbon and metals, have been mixed with the $Li_2S$ via ball milling or other techniques. Studies have also explored the use of solid state electrolytes to improve safety, ionic conductivity, or both. These studies unanimously demonstrated that dimensional reduction of the $Li_2S$ is crucial to achieve high capacity retention, cycling stability, and rate. They established that nanosized $Li_2S$ (nano-$Li_2S$) composites are particularly preferable to their microsized counterparts. One study disclosed that nanosized $Li_2S$ has higher ionic conductivity compared to the bulk form, and they claimed that this high ionic conductivity was responsible for the improved cycleability that they observed. Furthermore, nano-$Li_2S$ is believed to alleviate pulverization of the cathode from repeated cycling, and to offer shorter transport pathways for electrons and ions. To date, $Li_2S$ has been mainly synthesized via solid-state reactions and solution-based methods. These approaches lack the precision required for careful dimensional control in nanophase composites. Consequently, precise and nanoscale dimensional control over the $Li_2S$ component in composite cathodes is paramount for these Li—S systems.

Metal sulfides represent an important class of functional materials that exhibit exceptional electrical, optical, magnetic, and mechanical properties. Furthermore, the chemical properties of metal sulfides have stimulated their use in heterogeneous catalysis. Metal sulfides have also demonstrated excellent electrochemical properties, and this quality offers great potential for their use in energy conversion and energy storage devices. Consequently, metal sulfides have attracted great attention, and numerous techniques have been devised for synthesizing metal sulfide materials, including solution-based methods, chemical vapor deposition (CVD), and physical vapor deposition (PVD). Gallium sulfide ($GaS_x$) has two stable forms: GaS and $Ga_2S_3$. Both forms are wide-band-gap semiconductors, making them promising candidates for optoelectronics and photovoltaics.

Moreover, GaS$_x$ is ideal for passivating GaAs surfaces in high-mobility semiconductor devices. Previous reports have described the deposition of GaS and Ga$_2$S$_3$ thin films using PVD and CVD. In addition, nanostructured forms of GaS and Ga$_2$S$_3$ have been reported including nanoparticles, nanotubes, flowerlike structures, and nanowires and nanobelts. Unfortunately, PVD and CVD do not typically provide the necessary control over thickness and composition required for the precise synthesis of nanostructured materials.

Recently, atomic layer deposition (ALD) has emerged as a versatile technology for fabricating thin films and nanostructured materials. ALD utilizes alternating exposures between two or more precursor vapors and a solid surface to deposit material in an atomic layer-by-layer fashion. The unique aspect of ALD compared to conventional chemical and physical vapor deposition (CVD and PVD), is that the different precursors are supplied individually, and they react with the surface in a self-limiting manner. The self-limiting nature of ALD provides atomic-level precision over the film thickness and composition, and it yields exceptionally uniform films over large areas and in complex geometries. In particular, ALD films are exquisitely conformal and uniform, even on high surface area or high aspect ratio substrates, and the film thickness and composition can be controlled at the atomic level. Because of these benefits, ALD is being applied in energy devices, catalysis, medical and biological devices, plasmonic devices, nano- and microelectromechanical systems, and novel nanostructured materials. Because of their unique properties and numerous potential applications, metal sulfides are gaining interest in the ALD community.

A need exists for improved technology, including technology that may address the above problems, namely by providing an ALD mixed-metal solid state electrolyte or and method for manufacturing such a solid state electrolyte that permits the infiltration of porous electrodes and the deposition of thin, conformal films. The materials may also be used for protective electrode coatings.

SUMMARY

One embodiment of the invention relates to a method for using atomic layer deposition to produce a film configured for use in an anode, cathode, or solid-state electrolyte of a lithium-ion battery or a lithium-sulfur battery. The method includes repeating a cycle for a predetermined number of times in an inert atmosphere. The cycle includes exposing a substrate to a first precursor, purging the substrate with inert gas, exposing the substrate to a second precursor, and purging the substrate with inert gas. The film is a metal sulfide.

Another embodiment of the invention relates to a method for using atomic layer deposition to produce a film configured for use in an anode, cathode, or solid-state electrolyte of a lithium-ion battery or a lithium-sulfur battery. The method includes alternately repeating a first cycle and a second cycle for a predetermined number of times in an inert atmosphere. The first cycle includes exposing a substrate to a first precursor, purging the substrate with inert gas, exposing the substrate to a second precursor, and purging the substrate with inert gas. The second cycle includes exposing the substrate to a third precursor, purging the substrate with inert gas, exposing the substrate to a fourth precursor and purging the substrate with inert gas. The film is a metal sulfide.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which:

FIG. 1(a) illustrates an investigation of surface chemistry during ALD Li$_2$S: (a,b) In situ quartz crystal microbalance (QCM) measurements of ALD Li$_2$S at 150, 175, 200, and 300° C. using the timing sequence 5-5-5-5 s: (a) mass of Li$_2$S film versus time during 100 ALD cycles.

FIG. 1(b) illustrates an enlarged view of three consecutive ALD Li$_2$S cycles in the regime of constant growth per cycle (precursor pulsing is indicated by lower traces, and m$_1$, m$_2$, and $\Delta$m are described in the text).

FIG. 1(c) illustrates in situ Fourier transform infrared spectroscopy (FTIR) difference spectra recorded after individual LTB and H$_2$S exposures in the first, second, and tenth ALD cycle on an ALD Al$_2$O$_3$ surface at 225° C.; right-hand spectra show expanded views of the S—H stretching region.

FIG. 1(d) illustrates in situ quadrupole mass spectrometry (QMS) measurements during Li$_2$S ALD for alternating two consecutive LTB and two H$_2$S consecutive exposures at 225° C. Lower traces at bottom of graph indicate precursor pulsing during the alternating two consecutive LTB and two consecutive H$_2$S exposures as indicated.

FIG. 2(a) illustrates growth characteristics of ALD Li$_2$S, in particular, Li$_2$S film thickness versus ALD cycles in the temperature range of 150-300° C.

FIG. 2(b) illustrates growth characteristics of ALD Li$_2$S, in particular, refractive index and growth per cycle of ALD Li$_2$S films versus deposition temperature as measured by ex situ spectroscopic ellipsometry (SE).

FIG. 2(c) is a scanning electron microscope (SEM) image of ALD Li$_2$S film deposited in a high-aspect-ratio silicon trench substrate using 700 cycles at 150° C. at a lower magnification (as compared to FIG. 2(d)) showing the entire trench.

FIG. 2(d) is an SEM image of ALD Li$_2$S film deposited in a high-aspect-ratio silicon trench substrate using 700 cycles at 150° C. at a higher magnification (as compared to FIG. 2(c)) showing the top of the trench.

FIG. 5(a) is an SEM image of mesocarbon microbeads (MCMB) particles before 700-cycle ALD Li$_2$S coating.

FIG. 5(b) is an SEM image of MCMB particles after 700-cycle ALD Li$_2$S coating.

FIG. 5(d) shows charge-discharge profiles in the first three cycles (inset: the first three cycles versus time) with a voltage window of 1.6-3.0 V and a current density of 55 mA/g.

FIG. 5(e) shows cyclability and Coulombic efficiency (CE) measured over 36 charge-discharge cycles.

FIG. 6(a) shows charge-discharge profiles in the first three cycles with a voltage window of 1.6-3.0 V and a current density of 840 mA/g.

FIG. 6(b) shows cyclability and Coulombic efficiency over 500 cycles.

FIG. 6(c) shows rate capability.

FIG. 7(a) illustrates mass of GaS$_x$ film versus time during 50 ALD cycles (inset: mass per cycle during 50 ALD cycles).

FIG. 7(b) illustrates an enlarged view of three consecutive ALD GaS$_x$ cycles in the regime of constant growth per cycle. Precursor pulsing is indicated by lower traces, and the m$_1$, m$_2$, and Δm are described in the detailed description below.

FIG. 10(a) is an AFM image recorded from ALD GaS$_x$ films deposited with 150 cycles at 150° C.

FIG. 10(b) is an AFM image recorded from ALD GaS$_x$ films deposited with 600 cycles at 225° C.

FIG. 10(c) is an AFM image recorded from ALD GaS$_x$ films deposited with 300 cycles at 250° C.

FIG. 10(d) is an SEM image for the sample of FIG. 10(c).

FIG. 14(a) is a transmission electron microscopy (TEM) image of single-walled carbon nanotubes (SWCNTs) and their bundles.

FIG. 14(b) is a TEM image of SWCNTs coated by 50-cycle ALD GaS$_x$.

FIG. 14(c) is a TEM image of SWCNTs coated by 100-cycle ALD GaS$_x$.

FIG. 14(d) is a TEM image of SWCNTs coated by 150-cycle ALD GaS$_x$.

FIG. 14(e) is an annular dark field-scanning transmission electron microscope (ADF-STEM) image.

FIG. 14(f) is another ADF-STEM image.

FIG. 14(g) is a scanning transmission electron microscope-electron energy loss spectroscopy (STEM-EELS) mapping of gallium.

FIG. 14(h) is a STEM-EELS mapping of sulfur.

FIG. 14(i) is a STEM-EELS mapping of gallium and sulfur.

FIG. 16(a) is an illustration of Li$_x$Ga$_y$S$_z$ with tunable compositions by combining two individual ALD systems for Li—S and Ga—S, respectively.

FIG. 20 illustrates Coulombic efficiency of Li—Cu cells using Li metal and Cu foils uncoated or coated by ALD Al$_2$S$_3$ or ALD Li$_x$Al$_y$S, at a current density of 0.5 mA/cm2 for 2000-second Li deposition and 1 V controlled Li stripping.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 22:
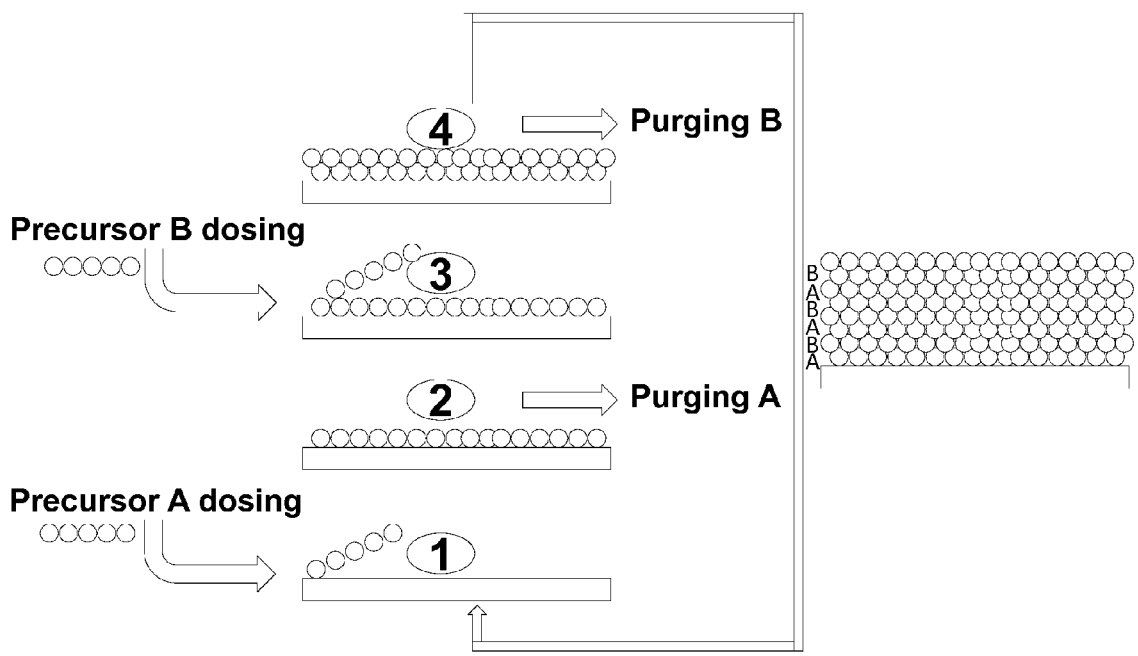
FIG. 22 illustrates a general ALD mechanism.

Referring, in general, to the figures, Atomic Layer Deposition (ALD) is used to produce films of $Li_2S$, $Ga_2S_3$, $Li_xGa_yS_z$, $Al_2S_3$ and $Li_xAl_yS$, for use in the anodes of Li-ion and LiS batteries. An example of an ALD mechanism is illustrated in FIG. 22. A method for using atomic layer deposition to produce a metal sulfide film configured for use in an anodes of a lithium-ion battery or a lithium-sulfur battery includes repeating a cycle a predetermined number of times, the cycle including: exposing a substrate to a first precursor, purging the substrate with an inert gas (such as nitrogen gas, argon gas, helium gas, etc.), exposing the substrate to a second precursor, and purging the substrate with an inert gas (such as nitrogen gas, argon gas, helium gas, etc.). An atomic layer timing sequence is $t_1$-$t_2$-$t_3$-$t_4$, corresponding to a duration $t_1$ of exposure to the first precursor, a duration of $t_2$ of a first inert gas purge, a duration $t_3$ of exposure to the second precursor, and a duration of $t_4$ of a second inert gas purge. In some embodiments, $t_1$, $t_2$, $t_3$, $t_4$ are equal, while in other embodiments, $t_1$, $t_2$, $t_3$, $t_4$ may be different values such that the duration of at least one step in the cycle is shorter than the duration of at least one other step in the cycle.

The electrical properties of the metal sulfide films have been better than commercially available anode material. In particular, ALD is used to custom-blend materials to adjust the lithium ion and electronic conductivities to address specific applications requiring different conductivities, with the key being ALD's unique capability to apply extremely thin and precise nanometer-scale conformal layers, including infiltrating porous electrode materials to provide excellent contact and produce nanocomposite materials with electrical properties superior to the bulk counterparts. These ALD films are much more conductive that conventional bulk electrolyte films that are much thicker. This invention extends to blending metal sulfide materials suitable for use in lithium ion batteries and in lithium sulfur batteries. Overall, this invention applies to battery electrodes, solid-state electrolytes and protective electrode coatings.

Nanoscale $Li_2S$

Referring to FIGS. 1-6 and 21, the atomically precise synthesis of nano-$Li_2S$ includes using a vapor-phase atomic layer deposition (ALD) via alternating exposures to lithium tert-butoxide (LTB, $LiOC(CH_3)_3$) and hydrogen sulfide ($H_2S$) (see FIG. 21) with a timing sequence, for example, of 5-5-5-5 s. Typical thicknesses relevant to batteries are in the range of 1-1000 nm, and would be produced using approximately 10-10000 ALD $Li_2S$ cycles. This provides atomic-scale controllability, low temperature, excellent uniformity and conformality. ALD relies on surface-controlled chemistry to accomplish layer-by-layer growth with sub-nm thickness control and has evolved into a versatile technique for nanostructured materials synthesis. A suite of in situ measurement and ex situ characterization methods were employed to establish the conditions for self-limiting growth, elucidate the $Li_2S$ ALD mechanism, and characterize the materials. Both pure $Li_2S$ nanofilms and nanoscale composites of carbon-supported $Li_2S$ were fabricated using this ALD route, and integrated into thin-film and bulk-type Li—S batteries exhibiting high storage capacity and excellent cyclability. Although the use of lithium tert-butoxide is disclosed above, other lithium precursors such as lithium acetylacetonate, 2,2,6,6-Tetramethyl-3,5-heptanedionato lithium, lithium cyclopentadienide, lithium pentamethylcyclopentadienide, or lithium 2-methyl-2-butoxide may be used.

Vapor-Phase $Li_2S$ ALD

A custom viscous flow, hot-walled ALD reactor comprised of a stainless steel flow tube with a length of 100 cm and an inner diameter of 5 cm was used to synthesize vapor-phase $Li_2S$. The $Li_2S$ ALD was performed by alternately dosing lithium tert-butoxide (LTB, $LiOC(CH_3)_3$) or $LiO^tBu$, 98%, and hydrogen sulfide ($H_2S$, 1% in $N_2$) with $N_2$ purging periods between each dose. To provide sufficient vapor pressure, the solid LTB was heated to ~140° C. in a stainless steel reservoir, and 50 sccm ultrahigh purity $N_2$ (UHP, 99.999%) was diverted through the reservoir during the LTB exposures. This yielded a partial pressure of ~0.01 Torr LTB in the flow tube. The 1% $H_2S$ was stored in a pressure-regulated lecture bottle. A series of needle valves was used to deliver 1% $H_2S$ pressure pulses of ~0.2 Torr during the $H_2S$ exposures. $Li_2S$ is air-sensitive and reacts readily with oxygen and moisture to form lithium sulfate and lithium hydroxide. The latter subsequently forms lithium carbonate by reaction with $CO_2$. Consequently, an Ar-filled glove bag was installed at the end of the ALD reactor flow tube to provide inert conditions for loading and unloading the coated substrates.

In Situ Investigation on Atomic-Scale Growth Mechanisms of ALD $Li_2S$

In situ quartz crystal microbalance (QCM), quadrupole mass spectrometry (QMS), and Fourier transform infrared spectroscopy (FTIR) measurements were used in combination to evaluate the conditions necessary for self-limiting growth, and to investigate the growth mechanism for the $Li_2S$ ALD.

FIG. 1(a) shows the time-resolved mass changes observed by in situ QCM during 100 alternating exposures to LTB and 1% $H_2S$ for $Li_2S$ ALD performed at 150, 175, 200, and 300° C. on an ALD $Al_2O_3$ starting surface using the timing sequence 5-5-5-5 s. This timing was determined to be optimal for the saturation growth of $Li_2S$ based on additional in situ QCM measurements (see FIG. 3). Above 300° C., LTB is known to decompose and the growth is expected to become non-self-limiting chemical vapor deposition (CVD). Prior to the $Li_2S$ ALD, an ALD $Al_2O_3$ film was deposited on the QCM surface using alternating trimethylalumnium (TMA) and $H_2O$ exposures with the timing sequence 1-5-1-5 s to establish a uniform starting surface. It is evident that the alternating LTB/$H_2S$ exposures deposit material at a relatively constant rate independent of substrate temperature. During the first ~20 ALD $Li_2S$ cycles (0-400 s) on the $Al_2O_3$ surface, the $Li_2S$ ALD growth per cycle was smaller before gradually increasing and stabilizing to a constant growth per cycle. The substrate-inhibited growth observed during the first 20 ALD cycles on the $Al_2O_3$ starting surface might result from surface poisoning by residual tert-butoxy ligands as will be discussed below for the FTIR measurements. In addition, the mass gain is anomalously high during the first $Li_2S$ ALD cycle on the $Al_2O_3$ surface in all cases, and this might result from tert-butoxy ligands that remain on the surface.

FIG. 1(b) shows an enlarged view of three consecutive $Li_2S$ ALD cycles performed at 200° C. recorded in the stable growth regime (i.e. after 1500 s of $Li_2S$ ALD), and highlights the mass changes resulting from individual LTB and $H_2S$ exposures. The LTB exposures cause a mass increase $m_1$=~36 $ng\cdot cm^{-2}\cdot cycle^{-1}$ while the $H_2S$ exposures decrease the mass by $m_2$=~19 $ng\cdot cm^{-2}\cdot cycle^{-1}$ to yield a net mass change Δm=~17 ng·cm$^{-2}$·cycle$^{-1}$. These mass changes can be used to establish the mechanism for Li$_2$S ALD assuming the following reactions:

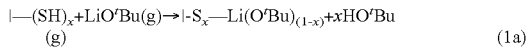

(1a)

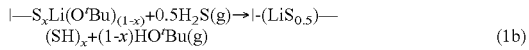

(1b)

In these equations, the symbol "|-" represents the surface, "g" denotes the gas phase, and a single LTB molecule reacts to form LiS$_{0.5}$ to simplify the analysis that follows. In Equation 1a, LTB reacts with x thiol (—SH) groups (with x in the range 0-1) liberating a fraction, x, of the —O$^t$Bu ligand into the gas phase as tert-butanol (HO$^t$Bu). In Equation 1b, H$_2$S removes the remaining fraction, (1-x), of the —O$^t$Bu ligand to form stoichiometric LiS$_{0.5}$ and repopulate the surface with thiols. These equations assume that: 1) thiol groups are the reactive species responsible for chemisorption of the LTB, 2) HO$^t$Bu is the only gas-phase product, and 3) the resulting film has the Li$_2$S stoichiometry.

Given Equation 1a, 1b, and the atomic masses, the QCM mass ratio can be written as:

$$R = \Delta m/m_1 = 23/(80-73x) \quad (2)$$

Based on the measured R values and Equation 2, the value for x versus the deposition temperature can be extracted. At 150° C., x~0.55 indicating that approximately 55% of the —O$^t$Bu ligands are released into the gas phase during the LTB exposures. However, x decreases significantly with temperature to x~0.20 at 300° C. The fraction of —OtBu ligands released during the LTB exposures is strongly dependent on the deposition temperature.

FIG. 1(c) presents FTIR difference spectra after each LTB and H$_2$S exposure for the 1$^{st}$, 2$^{nd}$, and 10$^{th}$ Li$_2$S ALD cycles. The first LTB exposure produces positive features in the ranges of 2865-2971 (antisymmetric and symmetric C—H stretching modes), 1364-1471, and 912-1471 cm$^{-1}$ (both from CH$_3$ deformation and rocking modes). The 1208 cm$^{-1}$ feature is ascribed to C—O stretching from adsorbed —O$^t$Bu groups. All of the aforementioned features are consistent with —O$^t$Bu ligands on the surface following the LTB exposure. Coincident with the appearance of the —O$^t$Bu features, a negative absorbance at 3739 cm$^{-1}$ was observed during the first cycle (not shown), due to the removal of the ALD Al$_2$O$_3$ hydroxyl groups. In comparison, the first H$_2$S exposure generates negative absorbance features corresponding to the removal of CH$_3$ and C—O. It is noteworthy that the decreases from the first H$_2$S exposure are smaller than the corresponding increases from the first LTB exposure, suggesting that some of the —O$^t$Bu ligands remain on the Al$_2$O$_3$ surface. Beginning with the second cycle, however, the difference spectra following consecutive LTB and H$_2$S exposures become symmetric, indicating that the creation and removal of ligands are equivalent as predicted by Equations 1a and 1b. A weak feature at ~2562 cm$^{-1}$ from the S—H stretch is seen to increase after the H$_2$S exposures and decrease following the LTB exposures confirming the first assumption stated above (FIG. 1(c), inset) that thiol groups are the reactive species responsible for chemisorption of the LTB.

FIG. 1(d) shows the HO$^t$Bu intensity versus time recorded by QMS during the Li$_2$S ALD where each precursor was dosed twice in succession so that the second dose would reveal any possible background signals. HO$^t$Bu was the only product observed by QMS validating assumption 2 above that HO$^t$Bu is the only gas-phase product. FIG. 1(d) reveals that a majority of the HO$^t$Bu species is released during the H$_2$S exposures. The QMS measurements can be quantified using the QMS product ratio:

$$R' = A/B = x/(1-x) \quad (3)$$

where A and B are the relative amounts of HO$^t$Bu released during the LTB and H$_2$S exposures, respectively. By integrating and averaging the QMS data in FIG. 1(d), R'=0.25 was obtained so that x=0.20. The value x=0.20 derived from the QMS measurements compares favorably with the value x=0.22 obtained by QCM at 225° C., lending credence to both methods. In summary, the in situ QCM, FTIR, and QMS measurements all support the Li$_2$S growth mechanism proposed in Equation 1a and 1b.

Growth Characteristics, Film Morphology, Composition, and Structure of ALD Li$_2$S Nanofilms Measurements using spectroscopic ellipsometry (SE) revealed that the nano-Li$_2$S growth was linear (see FIG. 2(a)), yielding ~1.1 Å/cycle in the full range of 150-300° C. as shown in FIG. 2(b). This value is ~10% higher than the value of 1.0 Å/cycle deduced from QCM assuming a bulk Li$_2$S density of 1.66 g/cm$^3$. The refractive index at 633 nm determined by SE is also nearly constant with temperature at ~1.4 (see FIG. 2(b)). This value is substantially lower than the value of n=1.9 reported for crystalline Li$_2$S. The refractive index is an indirect measure of density, and implies a lower density for the ALD Li$_2$S compared to crystalline Li$_2$S. By equating the QCM and SE growth per cycle values, a density of ~1.55 g/cm$^3$ is obtained for ALD Li$_2$S that is indeed lower than the bulk value. This lower density is consistent with the amorphous structure of ALD Li$_2$S determined by X-ray diffraction (XRD) measurements (see FIG. 4) Annealing the Li$_2$S films at 500° C. for 2 hours under Ar did not change the XRD patterns.

Using scanning electron microscopy (SEM), FIG. 2(c) shows high aspect ratio micromachined Si trenches coated by 700-cycle ALD Li$_2$S at 150° C., and reveals uniform and conformal deposition along the structures. FIG. 2(d) shows a higher magnification SEM image and emphasizes that the ALD Li$_2$S films are smooth and conformal such that the scalloped surface of the underlying Si is preserved. The Li$_2$S thickness extracted from FIG. 2(d) is ~70 nm, in good agreement with the growth per cycle of 1.1 Å/cycle deduced from the SE measurements.

In Situ Measurements During Li$_2$S ALD

The Li$_2$S ALD was systematically investigated using in situ quartz crystal microbalance (QCM). The QCM studies were conducted using a modified Maxtek Model BSH-150 sensor head with an RC quartz crystal sensor. The crystals were sealed within the sensor head using a high-temperature conducting epoxy, and the sensor head was modified to provide back-side purging of the crystal to confine growth to the front surface. During the ALD, a constant 300 sccm flow of UHP N$_2$ passed through the flow tube at a pressure of ~1.2 Torr. The Li$_2$S ALD timing can be described as: t$_1$-t$_2$-t$_3$-t$_4$, with t$_1$ and t$_3$ being the dosing times for the LTB and H$_2$S, respectively, and t$_2$ and t$_4$ being the corresponding purge times, with all times in seconds (s). Optimal timing for the saturated Li$_2$S growth was determined by QCM measurements, and is 5-5-5-5 s. Prior to the Li$_2$S ALD, an ALD Al$_2$O$_3$ film was deposited on the QCM surface using alternating trimethylalumnium (TMA) and H$_2$O exposures with the timing sequence 1-5-1-5 s to establish a uniform starting surface.

Additional in situ studies were performed using quadrupole mass spectrometry (QMS) and Fourier transform infrared spectroscopy (FTIR) to explore the surface chemical reactions responsible for the Li$_2$S ALD. The QMS was located downstream from the sample position in a differentially-pumped, high-vacuum chamber separated from the reactor by a 35 µm orifice. In situ QMS measurements were performed at 225° C. to detect and quantify the gas phase products of the $Li_2S$ ALD. First, a comprehensive survey was conducted of all masses between m/z=2-100 to identify the products of the LTB and $H_2S$ half reactions. The only product observed was tert-butanol, as evidenced by peaks at m/e=59, 41, and 31 in the expected ratios from the NIST database.

The FTIR was operated in transmission mode in a separate ALD reactor as described previously. The FTIR beam passed through the reactor via IR-transparent, KBr windows. Pneumatically actuated gate valves were closed during the precursor exposures to prevent growth on the KBr windows. Substrates for FTIR measurements were prepared by pressing $ZrO_2$ nanopowder (particle size<100 nm, specific surface area>25 $m^2$/g) into a stainless steel grid. The grids were fabricated by photochemical machining to be 50 µm thick with 50 µm bars and 200 µm square openings. $ZrO_2$ is relatively transparent between 4000 and 800 $cm^{-1}$, the frequency range of interest for identifying surface functional groups, and the high surface area amplified the IR absorption features. The nanopowder-filled grid was mounted onto a temperature-regulated stage. This stage was then loaded into the FTIR reactor so that the IR beam passed through the center of the grid. During the in situ FTIR measurements, the substrate temperature was maintained at 225° C. by the heated stage, and the reactor walls were also heated to ~225° C. to prevent precursor condensation. The FTIR substrates were first passivated with ALD $Al_2O_3$ by performing 8 $TMA/H_2O$ cycles. Next, 10 alternating exposures to LTB and 100% $H_2S$ were performed with the optimized timing sequence, and FTIR spectra were recorded after each precursor exposure.

Characterization of ALD $Li_2S$ Films

The ALD $Li_2S$ films were deposited onto Si(100), fused silica, micromachined Si trench wafers, copper foils, and graphite particles, and subsequently characterized using a variety of techniques. To preserve the air-sensitive $Li_2S$ coatings during transport to the characterization tools, the $Li_2S$-coated substrates were loaded into hermetically-sealed containers inside of the Ar-filled glove bag. Spectroscopic ellipsometry was employed, and the ellipsometric data were fit using a Cauchy model to extract the film thickness and refractive index. The SE measurements were conducted on ALD nano-$Li_2S$ films deposited on Si(100) substrates with the native oxide intact prepared in the temperature range of 150-300° C. These measurements were performed inside of an Ar-filled glove bag. The film morphology was examined by FE-SEM equipped with EDX. Due to the air-sensitive nature of $Li_2S$, the ALD nano-$Li_2S$ samples were protected by transporting them in Ar-filled containers. Although the ALD nano-$Li_2S$ films received a brief exposure (~10 s) to air when loading into the SEM, this had a negligible effect on the morphology as explained below. The $Li_2S$ films were annealed in a muffle furnace located in an Ar-filled glove box with moisture and oxygen levels below 1 ppm.

The crystallinity of the as-deposited and annealed $Li_2S$ films was determined by X-ray diffraction. For these measurements, the samples were covered by a Kapton film that had previously been coated with ~20 nm ALD $Al_2O_3$ to protect them from moisture. Both Kapton and $Al_2O_3$ are X-ray transparent, and we have previously demonstrated that this covering provides excellent protection from the air. The film composition was measured by X-ray fluorescence spectroscopy and X-ray photoelectron spectroscopy. Before the XRF measurements, the $Li_2S$ films were covered by ALD $Al_2O_3$-coated Kapton films, as used for the XRD measurements. The XPS was equipped with a monochromated Al—Kα (1486.6 eV) X-ray source and an airless entry system. Depth profiling measurements were performed using $Ar^+$ sputtering. The sputter rate was calibrated using $SiO_2$, accounting for an $SiO_2$-equivalent rate of 7.81 Å/min. The analysis area was 1400×300 µm.

X-ray absorption was performed at the Advanced Photon Source, sector 13-ID-E in fluorescence mode. The ALD sample consisted of $Li_2S$ grown on graphene nanosheets and the bulk standard was purchased from Sigma-Aldrich. Samples were spread on sulfur-free tape and sealed in aluminized Kapton. Each spectrum showed little evolution over repeated scans and was not corrected for self-absorption.

Electrochemical Testing of ALD $Li_2S$ Films and Nanocomposites

To evaluate the electrochemical properties of the ALD $Li_2S$, nanofilms were deposited in the temperature range of 150-300° C. onto Cu foils and graphite laminates made from mesocarbon microbeans and subsequently tested as a LIB electrode material. The graphite laminates were made by casting a slurry of 90 wt % MCMB, 2 wt % vapor-grown carbon fiber, and 8 wt % poly(vinylidene fluoride) (PVDF) binder dispersed in N-methyl-2-pyrrolidone onto copper foils, as detailed previously. The MCMB particles had a surface area of 1.96 $m^2$/g, and the dried laminates were 56-µm thick with a porosity of 42.2%. The $Li_2S$-coated substrates were assembled into CR2032 coin cells in an Ar-filled glove box. Li metal was used as the counter/reference electrode, and a Celgard 2400 membrane was used as the separator. The electrolyte used was 1 M lithium bis(trifluoromethanesulfonyl)imide (LITFSI) in 1,3-dioxolane (DOL) and 1,2-dimethoxyethane (DME) (DOL:DME=1:1 by volume). Charge/discharge testing was performed on an Arbin 2043 electrochemical tester using a voltage window of 1.6-3.0 V for the $Li_2S$ electrodes.

Electrochemical Performance of ALD $Li_2S$ Nanofilms in Li—S Batteries

With the synthetic process for nano-$Li_2S$ established, the electrochemical characteristics of the resulting materials were investigated and the significance of precise control over the $Li_2S$ size was demonstrated. Laminates were prepared using mesocarbon microbeans (MCMBs) and subsequently coated with ALD $Li_2S$. After 700 $Li_2S$ ALD cycles at 200° C., the MCMB particles became more rounded and the laminate porosity was reduced (compare FIGS. 5(a) and 5(b)). In addition, the ALD $Li_2S$ film imparted a uniform texture to the surface comprised of 50 nm features. Elemental mapping using energy dispersive X-ray spectroscopy (EDX) revealed uniform spatial distributions for C (MCMB), F (PVDF binder) and S (ALD $Li_2S$) (FIG. 5(c)). Cross-sectional SEM demonstrated that the ALD $Li_2S$ uniformly infiltrates the laminates. Similar results were obtained from MCMB laminates coated with 360-cycle ALD $Li_2S$ at 300° C.

Figure 3A:
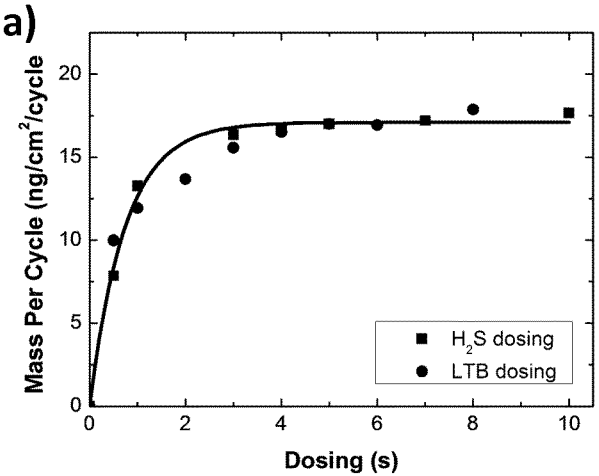
FIG. 3(a) illustrates the effects of precursor dosing and purging on Li$_2$S ALD as measured by QCM, in particular, an effect of LTB and H$_2$S dosing times.
Figure 3B:
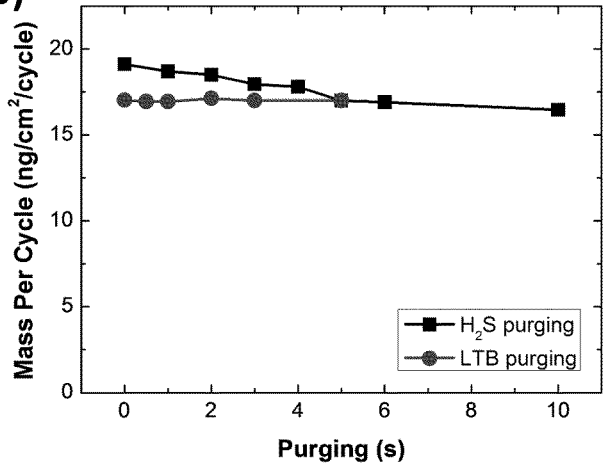
FIG. 3(b) illustrates the effects of precursor dosing and purging on Li$_2$S ALD as measured by QCM, in particular, an effect of LTB and H$_2$S purging times.
Figure 4:
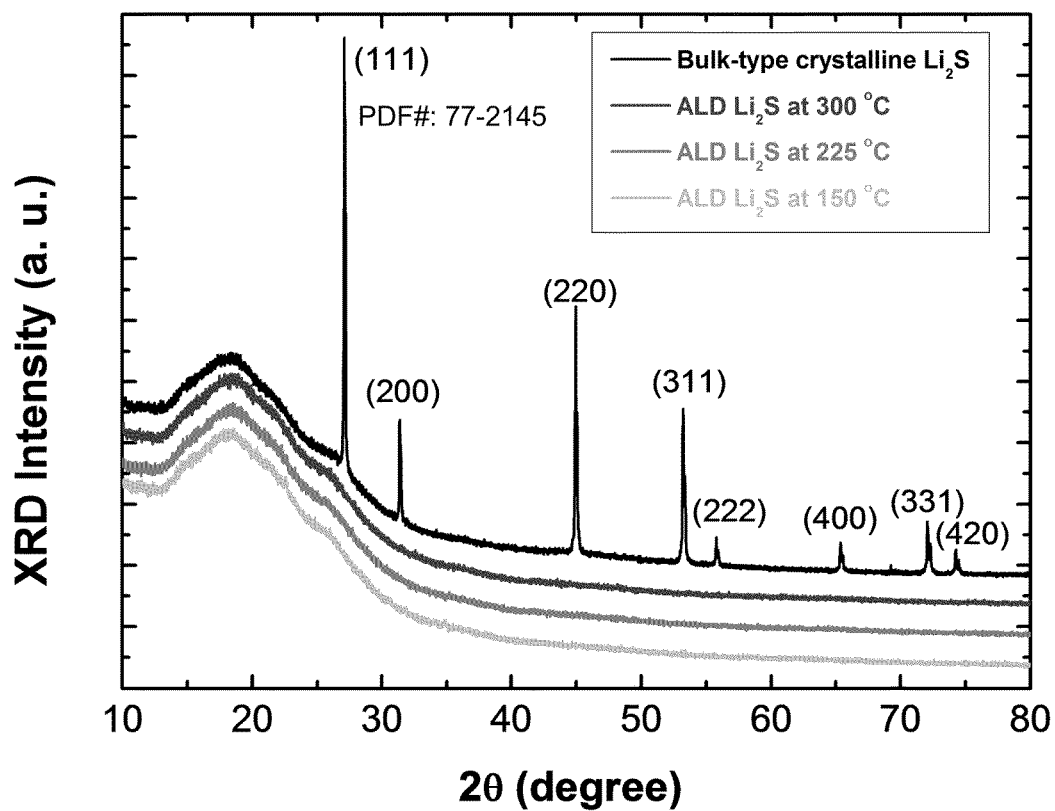
FIG. 4 illustrates XRD patterns of ALD Li$_2$S films deposited at different temperatures in comparison to a commercial, bulk-type crystalline Li$_2$S specimen.
Figure 5A:
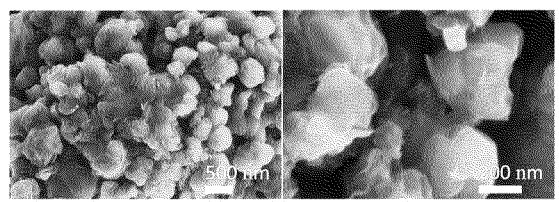
FIG. 5(a) illustrates the electrochemical performance of ALD Li$_2$S. In particular.
Figure 5B:
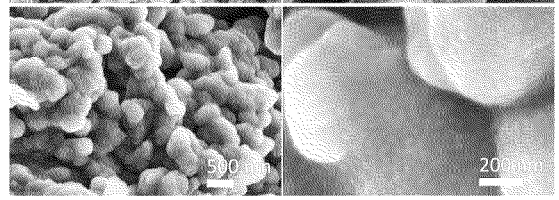
FIG. 5(b) illustrates the electrochemical performance of ALD Li$_2$S. In particular.
Figure 5C:
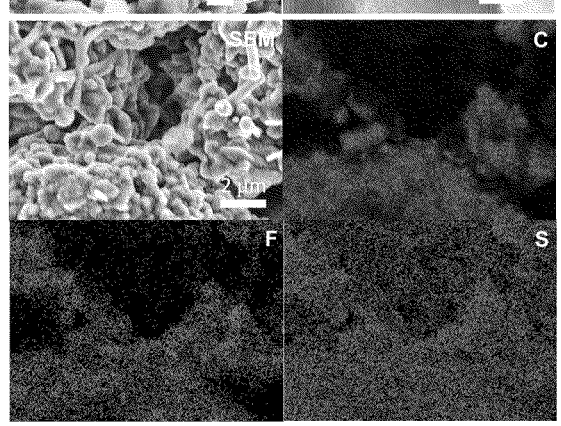
FIG. 5(c) illustrates an energy dispersive X-ray (EDX) analysis of ALD Li$_2$S film deposited on MCMB particles, using 700 cycles at 200° C.: (top-left) SEM image, (top-right) C elemental map, (bottom-left) F elemental map, and (bottom-right) S elemental map.
Figure 5D:
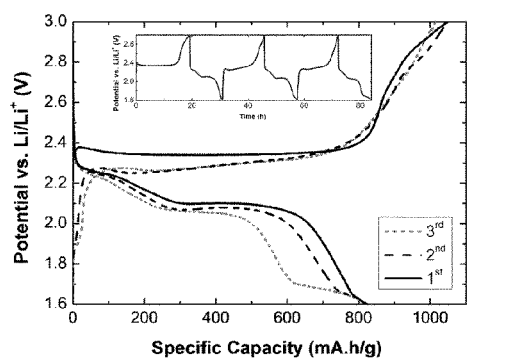
FIG. 5(d) illustrates the electrochemical characteristics of Li$_2$S films deposited on MCMB particles using 360 ALD Li$_2$S cycles at 300° C. In particular.

FIG. 5(d) shows charge-discharge profiles for the 360-cycle ALD $Li_2S$ deposited on the MCMB laminates. A long, flat plateau is seen at ~2.34 V during the $1^{st}$ charge, corresponding to the oxidative reaction: $8Li_2S \rightarrow S_8$. The $1^{st}$ discharge shows a plateau at 2.2-2.3 V ($S_8+2Li \rightarrow Li_2S_8$), a slope at 2.1-2.2 V ($Li_2S_8 \rightarrow Li_2S$, $3 \leq n \leq 7$), a second plateau at 2.1 V ($Li_2S_n \rightarrow Li_2S_2$ or $Li_2S$), and a slope between 1.6-2.1 V ($Li_2S_2 \rightarrow Li_2S$). These observations are consistent with the electrochemical behavior of crystalline $Li_2S$, but no potential barrier was seen for the $1^{st}$ charge, as reported for microsized crystalline $Li_2S$.

Figure 5E:
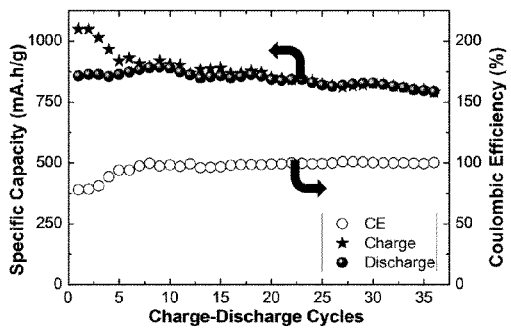
FIG. 5(e) illustrates the electrochemical characteristics of Li$_2$S films deposited on MCMB particles using 360 ALD Li$_2$S cycles at 300° C. In particular.

Notably, the charge capacities are larger than the corresponding discharge capacities in the first three cycles, suggesting S shuttling as commonly observed during $Li_2S$ oxidation. FIG. 5(e) shows the charge and discharge capacities recorded over 36 cycles, and demonstrates a sustained capacity of ~800 mAh/g corresponding to ~76% of the first charge capacity and 93% of the first discharge capacity. In addition, the ALD $Li_2S$ films show a Coulombic efficiency of 100% beginning with the $6^{th}$ cycle, implying that S shuttling was greatly alleviated.

Two factors, based on previous studies, may contribute to the exceptional cyclability and sustained high capacity of ALD $Li_2S$ nanofilms on MCMBs. First, the MCMB surface is rich in surface functional groups (e.g., hydroxyl, carbonyl, and epoxy) and recent studies have demonstrated that these same reactive surface groups on graphene oxide served to anchor polysulfides thereby improving Li—S battery performance. The second factor relates to the use of a Cu current collector. A recent study demonstrated that Cu nanoparticles could stabilize sulfur cathodes in Li—S batteries, and another work showed that Cu foils were superior to Al foils for $Cu_2S$ cathodes. Evidence for this second factor can be found in FIG. 5(d), where a new plateau emerges with the 3rd discharge at ~1.7 V indicating $Cu_xS$ formation. An early study disclosed that Cu converted to $Cu_xS$ in polysulfide-rich organic solutions.

Similar behavior was observed for the MCMB electrodes coated with 700-cycle ALD $Li_2S$ at 200° C.: a sustained capacity of ~400 mA·h/g over 30 cycles and a high Coulombic efficiency of ~100% starting from the $7^{th}$ cycle. The lower capacity compared to the 360-cycle ALD $Li_2S$ film may stem from the greater film thickness which imposes a longer path for Li ion and electron transport through the insulating $Li_2S$. No potential barrier was observed during the $1^{st}$ charge for either of the ALD $Li_2S$ films. This is attributed to the amorphous and nanosized nature of the films, which improve the Li ion and electron transport. Also noteworthy is the excellent cyclability without the need for electrolyte additives such as $LiNO_3$ and polysulfides, which have been widely used in literature (FIG. 5(e)).

Figure 6A:
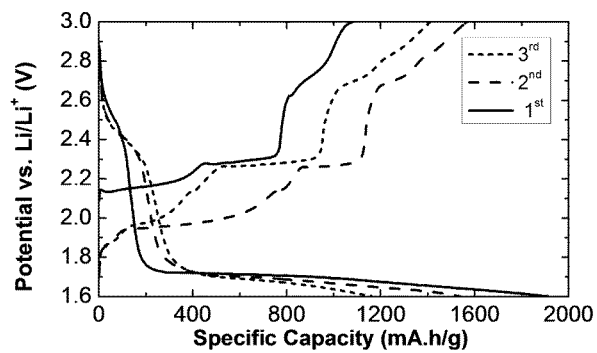
FIG. 6(a) illustrates the electrochemical characteristics of Li$_2$S films deposited onto 2D planar Cu foils using 700 ALD Li$_2$S cycles at 200° C. In particular.

To better understand the effects of using Cu current collectors, ALD $Li_2S$ nanofilms were deposited on Cu foils and electrochemical testing was performed. The long-term cyclability and rate capability of the ALD $Li_2S$ films were investigated using 700-cycle ALD $Li_2S$ deposited onto Cu foils at 200° C. FIG. 6(a) shows the first three charge-discharge profiles for this sample. The $1^{st}$ charge profile shows the typical characteristics of $Li_2S$. However, the $1^{st}$ discharge diverges somewhat from the expected $Li_2S$ behavior. In particular, there is a slope between ~2.6-2.4 V, a fast drop from between 2.4-1.7 V, and a long declining plateau at ~1.7 V. These changes can be ascribed to the Cu foil, for the oxidized S after the $1^{st}$ charge can react with Cu to produce $Cu_2S$ and/or CuS. Based on the characteristics of the three discharge profiles, the distinct plateau at 1.7 V suggests that $Cu_2S$ is formed after the $1^{st}$ charge. After the $1^{st}$ discharge, both Cu and $Li_2S$ would be produced. Thus, it is easy to understand that the following $2^{nd}$ charge exhibits the electrochemical characteristics of both $Cu_xS$ (x=1,2) and $Li_2S$, as illustrated in FIG. 6(a). As a consequence, the Cu foil affected the charge-discharge cycles of the ALD $Li_2S$, starting from the $1^{st}$ discharge. Similar effects of Cu foils have been reported with S and other metal sulfides.

Figure 6B:
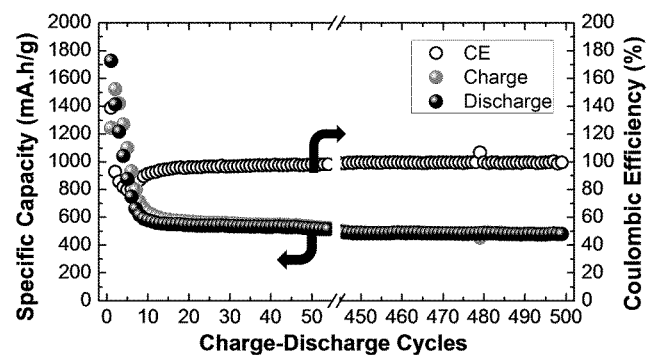
FIG. 6(b) illustrates the electrochemical characteristics of Li$_2$S films deposited onto 2D planar Cu foils using 700 ALD Li$_2$S cycles at 200° C. In particular.
Figure 6C:
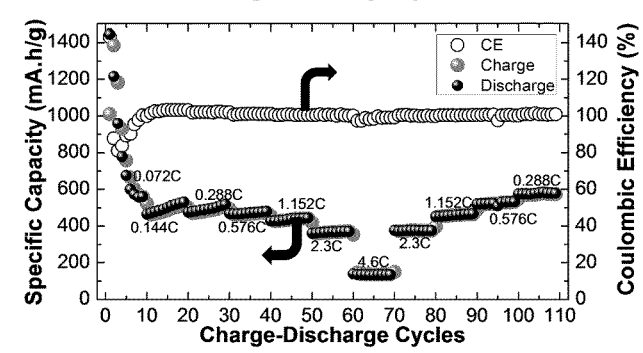
FIG. 6(c) illustrates the electrochemical characteristics of Li$_2$S films deposited onto 2D planar Cu foils using 700 ALD Li$_2$S cycles at 200° C. In particular.

Due to the involvement of Cu, there is extra capacity observed in the first three cycles (except for the $1^{st}$ charge). This 700-cycle ALD $Li_2S$ thin film on Cu foil demonstrates very good cycling performance at a current density of 840 mA/g, as shown in FIG. 6(b). Except for the capacity drop in the first ten cycles (probably due to partial dissolution of $Li_2S$), the ALD $Li_2S$ film remained nearly constant at ~500 mA·h/g over 500 cycles and achieved a Coulombic efficiency of ~100% from the $15^{th}$ cycle. Furthermore, the 700-cycle ALD $Li_2S$ thin film on Cu foil also exhibits very good rate capabilities, as shown in FIG. 6(c), except for fast capacity fading in the first 5 cycles. This ALD $Li_2S$ film maintained stable capacities of 510, 500, 480, and 380 mA·h/g at current densities of 168 (0.144 C), 336 (0.288 C), 672 (0.576 C), 1344 (1.152 C), and 2688 mA/g (2.3 C), respectively. At the very high current density of 5376 mA/g (4.6 C), the ALD $Li_2S$ film exhibited a capacity of 135 mA·h/g. All the exceptional performance of ALD $Li_2S$ might have been due to the use of Cu as current collectors, as discussed above. In addition, the thin ALD $Li_2S$ layers probably facilitated the formation of $Cu_xS$ as the actual active materials.

As explained above, the ALD process described above yields precisely controlled nanoscale $Li_2S$ films on 2D Cu foils and 3D layers of MCMBs. The results demonstrated that ALD $Li_2S$ is viable for developing high-performance and high-energy Li—S microbatteries. Given the conformal nature of ALD, it should also be feasible to synthesize nanophase composites with high $Li_2S$ loadings for bulk-type Li—S batteries, using ALD on high-surface-area supports. Indeed, preliminary studies using high-surface-area GNS have produced $Li_2S$ loadings as high as 67 wt. %, and the resulting composites exhibit excellent cycling performance in Li—S batteries.

The vapor-phase method for synthesizing amorphous nano-$Li_2S$ described above provides atomic-level thickness control at low temperatures. The exceptionally uniform and conformal nanoscale films enabled $Li_2S$ to achieve high performance as a Li—S cathode. No potential barrier for activation was seen during charging, and the ALD $Li_2S$ exhibited a high, sustained capacity of up to 800 mA·h/g, excellent cyclability, and high Coulombic efficiency without the need for electrolyte additives. Besides the amorphous structure and precise, nanoscale thickness afforded by the ALD $Li_2S$ films, the excellent electrochemical performance also stems from using the Cu current collector and MCMBs. This atomic-controllable vapor-phase synthesis route and the resulting nanoscale conformal $Li_2S$ films are significant for developing high-energy Li—S batteries.

In addition to its role in Li—S batteries, $Li_2S$ is critical in many inorganic solid electrolytes. Solid electrolytes are regarded as an ultimate solution for the battery safety issues imposed by flammable, organic liquid electrolytes. Among the known solid electrolytes, sulfide-based materials exhibit the highest ionic conductivity, rivaling that of liquid electrolytes.

Gallium Sulfide

Referring to FIGS. 7-13, the synthesis of gallium sulfide ($GaS_x$) using ALD includes using alternating exposures to hexakis(dimethylamido)digallium ($Ga_2(NMe_2)_6$) and hydrogen sulfide ($H_2S$). The optimal timing sequence is 5-5-10-5 s. Typical thicknesses relevant to batteries are in the range of 1-1000 nm, and would be produced using approximately 20-20000 ALD $GaS_x$ cycles at a deposition temperature of 125° C. $Ga_2(NMe_2)_6$ was selected based on its combination of high reactivity and volatility. However, other gallium precursors such as hexakis(diethylamido)digallium, hexakis(ethyl-methylamido)digallium, gallium(III) acetylacetonate, tris(2,2,6,6-tetramethyl-3,5-heptanedionato)gallium(III), gallium(III) hexafluoroacetylacetonate, or trimethylgallium may be used.

In one embodiment, the $GaS_x$ ALD was conducted in a custom viscous flow, hot-walled ALD reactor comprised of a 1 m stainless steel tube with an inner diameter of 5 cm. Before each deposition, substrates (i.e., Si wafers, fused silica, micromachined Si trenches, capillary glass arrays, and copper foils) were first loaded in the reactor. During the ALD, a constant 300 sccm flow of ultrahigh purity $N_2$ (UHP, 99.999%) passed through the flow tube at a pressure of 1 Torr. The ALD $GaS_x$ was performed using alternating exposures to $Ga_2(NMe_2)_6$ (98%) and 1% $H_2S$ in $N_2$ with $N_2$ purge periods between each exposure. $H_2S$ must be used with care due to its high toxicity, flammability, and corrosive nature. 1% $H_2S$ was used in order to remain below the flammability limit. Furthermore, a flow monitor was utilized in the exhaust manifold of the ALD system to ensure that the effluent gases were never released into the room. To provide sufficient vapor pressure, the solid $Ga_2(NMe_2)_6$ was heated to 100° C. in a stainless steel reservoir, and 50 sccm UHP $N_2$ was diverted through the reservoir during the $Ga_2(NMe_2)_6$ exposures. This yielded a partial pressure of ~0.01 Torr $Ga_2(NMe_2)_6$ in the flow tube. The 1% $H_2S$ was stored in a pressure-regulated lecture bottle. A series of needle valves was used to deliver 1% $H_2S$ pressure pulses of 0.2 Torr during the $H_2S$ exposures. The $GaS_x$ ALD timing can be described as: $t_1$-$t_2$-$t_3$-$t_4$, with $t_1$ and $t_3$ being the exposure times for the $Ga_2(NMe_2)_6$ and $H_2S$, respectively, and $t_2$ and $t_4$ being the corresponding purge times, with all times in seconds (s). The optimal timing is 5-5-5-5 s.

The $GaS_x$ ALD was systematically investigated using in situ quartz crystal microbalance (QCM) measurements. The QCM studies were conducted using a modified Maxtek Model BSH-150 sensor head and RC quartz crystal sensor. The RC quartz sensors are less sensitive to temperature fluctuations compared to conventional AT quartz sensors, thereby reducing the effects of temperature-induced transients and temperature drift on the QCM measurements. The crystals were sealed within the sensor head using epoxy, and the sensor head was modified to provide back-side purging of the crystal to prevent deposition.

Additional in situ studies were conducted using quadrupole mass spectrometry (QMS) and Fourier transform infrared spectroscopy (FTIR) measurements to explore the surface chemical reactions responsible for the $GaS_x$ ALD. The QMS was located downstream from the sample position in a differentially pumped chamber separated from the reactor by a 35 μm orifice. The FTIR was operated in transmission mode in a separate ALD reactor as described previously. The FTIR reactor utilized gate valves that were closed during the precursor exposures to prevent growth on the KBr windows. Substrates for FTIR measurements were prepared by pressing $ZrO_2$ nanopowder (<100 nm TEM, >25 m²/g) into a stainless grid. The grids were fabricated using photochemical machining and were 50 μm thick with 50 μm bars and 200 μm square openings. $ZrO_2$ is relatively transparent from 4000 to 800 $cm^{-1}$, the frequency range of interest for identifying surface functional groups. The nanopowder-filled grid was mounted onto a stage that could be heated to 500° C. This stage was then loaded into the FTIR reactor so that the IR beam passed through the center of the grid. During the in situ FTIR measurements, the substrate temperature was maintained at 150° C. by the heated stage, and the reactor walls also were maintained at 150° C. to prevent precursor condensation.

For the ex situ analysis, ALD $GaS_x$ films were deposited on Si and fused silica substrates and characterized using a variety of techniques. Spectroscopic ellipsometry was employed and the ellipsometric data were fitted using a Cauchy model to determine the film thickness and refractive index. The film morphology was examined by atomic force microscopy and field emission scanning electron microscopy equipped with energy dispersive X-ray spectroscopy (EDX). The as-deposited films also were studied by synchrotron-based X-ray reflectivity (XRR) using the beamline 11-ID-D at the Advanced Photon Source (APS, Argonne National Laboratory, IL, USA). The crystallinity of the as-deposited and annealed $GaS_x$ films were determined by X-ray diffraction (XRD). The annealing was conducted in a muffle furnace located in an Ar-filled glove box with moisture and oxygen levels below 1 ppm. The film composition was measured by X-ray fluorescence (XRF), Rutherford backscattering spectrometry (RBS), and X-ray photoelectron spectroscopy (XPS). The RBS measurements were performed using a 2.275 MeV $He^{2+}$ ion beam with backscattering angle of 160° and a grazing angle of 100°. The XPS was equipped with a monochromated Al—Kα (1486.6 eV) X-ray source and depth profiling measurements were performed using $Ar^+$ sputtering. The sputter rate was calibrated using $SiO_2$, accounting for a $SiO_2$-equivalent rate of 7.81 Å/min. The analysis area was 1400×300 μm.

To evaluate the electrochemical properties of the ALD $GaS_x$, films were deposited on Cu foils at 150° C. and tested as a LIB electrode material. The $GaS_x$ films were assembled into CR2032 coin cells in a glove box. Li metal was used as the counter/reference electrode, a Celgard 2400 membrane was used as the separator, and 1.2 M $LiPF_6$ in ethylene carbonate/ethyl methyl carbonate (EC:EMC=3:7 by weight) was used as the electrolyte. The charge/discharge testing was performed on an Arbin 2043 electrochemical tester using a voltage window of 0.01-2.00 V for the $GaS_x$ electrodes.

In Situ QCM Measurements During $GaS_x$ ALD

Figure 7A:
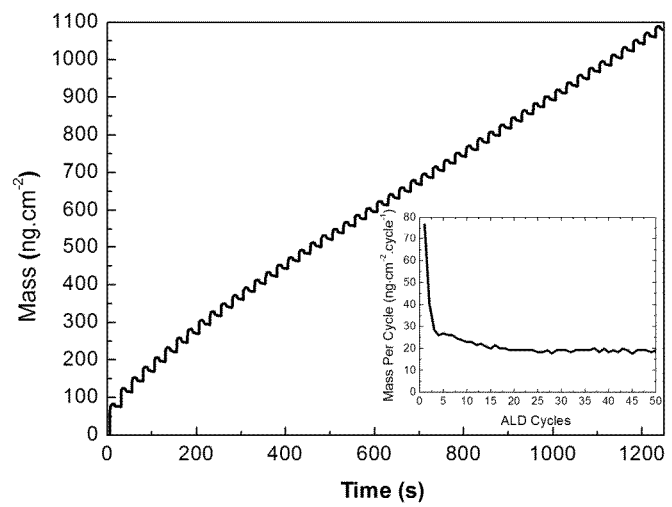
FIG. 7(a) illustrates in situ QCM measurements of ALD GaS$_x$ at 200° C. using the timing sequence 5-5-10-5 s. In particular.
Figure 7B:
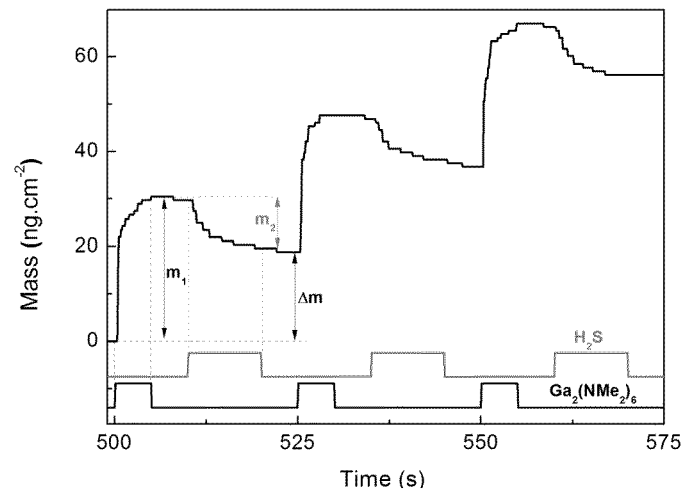
FIG. 7(b) illustrates in situ QCM measurements of ALD GaS$_x$ at 200° C. using the timing sequence 5-5-10-5 s. In particular.

FIG. 7(a) illustrates the time-resolved mass changes observed by in situ QCM during 50 alternating exposures to $Ga_2(NMe_2)_3$ and $H_2S$ for $GaS_x$ ALD performed at 200° C. using the timing sequence 5-5-10-5 s. This timing sequence was determined to be optimal based on in situ QCM measurements. Prior to the $GaS_x$ ALD, an ALD $Al_2O_3$ film was deposited on the QCM surface using alternating trimethylalumnium (TMA) and $H_2O$ exposures with the timing sequence 1-5-1-5 s to establish a uniform starting surface. During the first ~15 ALD $GaS_x$ cycles (0-375 s) on the $Al_2O_3$ surface, the $GaS_x$ ALD growth per cycle was larger before gradually decreasing and stabilizing to a constant growth per cycle value. This behavior is most easily seen in the inset of FIG. 7(a) which shows the net mass change per cycle versus the number of $GaS_x$ ALD cycles. After ~375 s or ~15 ALD cycles, the QCM data exhibited a linear increase in mass versus time at ~19 $ng \cdot cm^{-2} \cdot cycle^{-1}$. FIG. 7(b) shows an enlarged view of three consecutive $GaS_x$ ALD cycles in the stable growth regime, and highlighted the mass changes resulting from the individual $Ga_2(NMe_2)_6$ and $H_2S$ exposures. The $Ga_2(NMe_2)_6$ exposures caused a mass increase $m_1 = \sim 31$ $ng \cdot cm^{-2} \cdot cycle^{-1}$ while the $H_2S$ exposures decreased the mass by $m_2 = \sim 12$ $ng \cdot cm^{-2} \cdot cycle^{-1}$ to yield a net mass change $\Delta m = \sim 19$ $ng \cdot cm^{-2} \cdot cycle^{-1}$. These mass changes can be used to establish the mechanism for $GaS_x$ ALD assuming the following surface reactions:

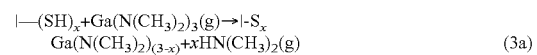

(3a)

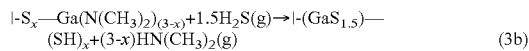

$$|\text{-}S_x\text{---}Ga(N(CH_3)_2)_{(3-x)} + 1.5H_2S(g) \rightarrow |\text{-}(GaS_{1.5})\text{---} \\ (SH)_x + (3-x)HN(CH_3)_2(g) \quad (3b)$$

in which the symbol "|-" represents the surface, "(g)" denotes gaseous phase, and the monomeric Ga compound is used for simplicity. In particular, x is between 0 and 3. In Equation 3a, the Ga compound reacts with x thiol groups (i.e., —SH) liberating x of the three dimethylamido-ligands (i.e., —NMe$_2$) into the gas phase. In Equation 3b, the H$_2$S removes the remaining (3-x) dimethylamido-ligands into the gas phase to form stoichiometric Ga$_2$S$_3$ and repopulate the surface with thiols. These equations assume that thiol groups are the reactive species responsible for chemisorption of the Ga compound, and that the resulting film has the Ga$_2$S$_3$ stoichiometry.

Given Equations 3a, 3b and the atomic masses, the surface species can be related to the QCM mass ratio using:

$$R = \Delta m/m_1 = 118/(202-45x) \quad (4)$$

In FIG. 7(b), R=0.63 so that x=0.32, implying that 0.32/3 or ~10% of the dimethylamido-ligands are released as DMA, leaving nearly 90% on the GaS$_x$ surface following the Ga precursor reaction, Equation 3a.

Figure 8:
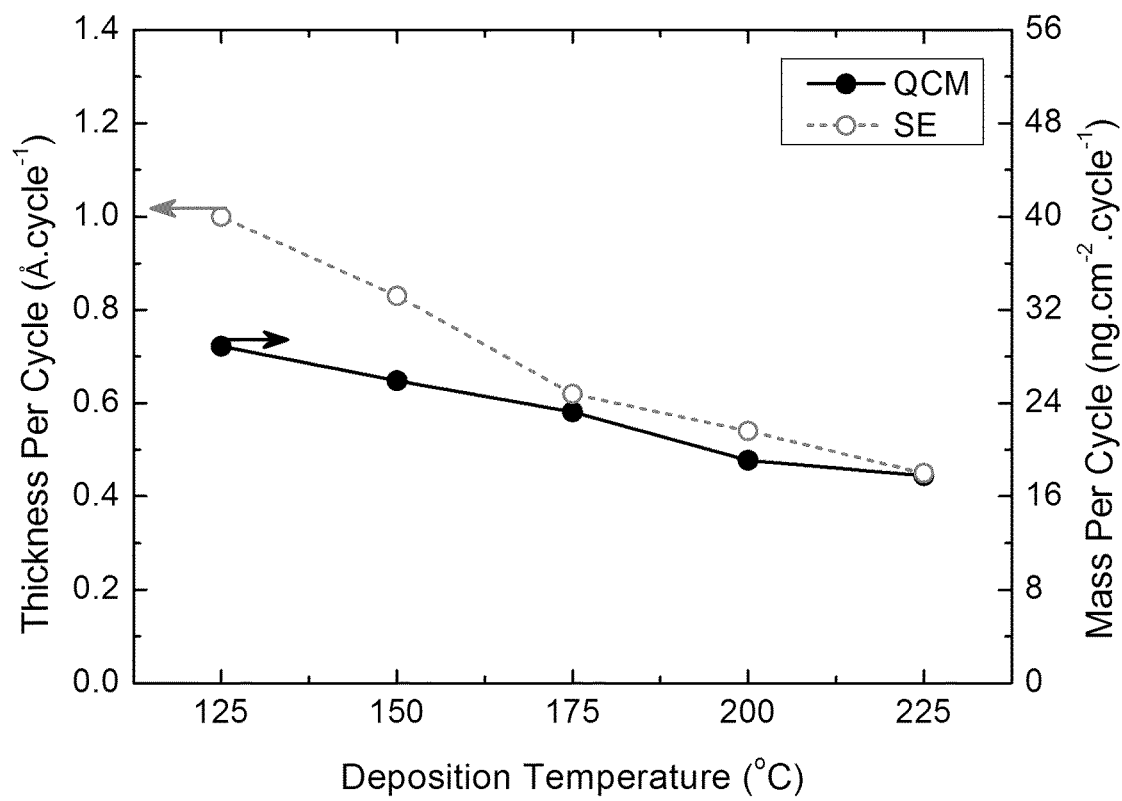
FIG. 8 illustrates ALD GaS$_x$ growth per cycle versus deposition temperature as measured by ex situ spectroscopic ellipsometry (open symbols) and in situ QCM (solid symbols).

Additional QCM measurements were performed in the temperature range 125 to 275° C. to explore the useful range for self-limiting growth, and the results are summarized in FIG. 8. As shown by the solid black symbols in FIG. 8, the ALD GaS$_x$ mass per cycle decreased linearly with temperature from 30 ng·cm$^{-2}$·cycle$^{-1}$ at 125° C. to 17 ng·cm$^{-2}$·cycle$^{-1}$ at 225° C. At higher temperatures, the GaS$_x$ growth was found to be non self-limiting and this phenomenon will be discussed in more detail below. In addition to the decrease in growth per cycle, it was observed that the QCM mass ratio, R=Δm/m$_1$, also decreased with increasing growth temperature, implying that a greater fraction of the dimethylamido-ligands from same Ga$_2$(NMe$_2$)$_6$ molecules were adsorbed on the surface, or conversely, that the surface thiol coverage was lower, at the higher growth temperatures. This finding provides a possible explanation for the decrease in growth per cycle with increasing deposition temperature: at the higher growth temperatures, the surface thiol coverage is lower and consequently a larger proportion of the dimethylamido-ligands from same Ga$_2$(NMe$_2$)$_6$ molecules remain bound to the surface. This imposes a greater steric hindrance towards the adsorption of additional Ga$_2$(NMe$_2$)$_6$ molecules thereby reducing the GaS$_x$ growth per cycle.

In Situ FTIR and QMS Measurements During GaS$_x$ ALD

In order to validate the assumptions made above for the mechanism of GaS$_x$ ALD, additional in situ measurements using FTIR and QMS were conducted. Prior to the FTIR measurements, the nanopowder-filled grid was annealed at 400° C. for 10 minutes, and then exposed to 30 pulses of 10 second exposures to oxygen flowing at 350 sccm followed by 30 seconds of purging. This treatment was performed to burn away hydrocarbon contaminants thereby lowering the background signals in the FTIR spectra. The sample was then cooled to 150° C. and passivated with ALD Al$_2$O$_3$ by performing 8 TMA/H$_2$O cycles with an optimized dosing/purging setting of 30-60-30-60 s. Next, 9 alternating Ga$_2$(NMe$_2$)$_6$/H$_2$S exposures were performed with an optimized dosing/purging setting of 120-60-30-60 s, and FTIR spectra were recorded after each precursor exposure. 100% H$_2$S was used for the FTIR studies. FTIR difference spectra were generated by subtracting the previous spectrum, so that positive absorbance features indicated the formation of new surface species, and negative absorbance features indicated the removal of surface species. FTIR difference spectra after each precursor exposure for the 1$^{st}$ 2$^{nd}$, and 9$^{th}$ GaS$_x$ ALD cycles were observed. The first Ga$_2$(NMe$_2$)$_6$ exposure produced positive features in the ranges of 2774-2933 and 891-1575 cm$^{-1}$. The 2774-2993 cm$^{-1}$ features mainly resulted from the antisymmetric and symmetric C—H stretching modes. In particular, the C—H stretching vibration at 2774 cm$^{-1}$ is known as a Bolhmann band, and results from the N lone pair orbital interacting with the C—H σ-orbital in the N(CH$_3$)$_2$ surface species. This feature provided strong evidence that at least a fraction of the N(CH$_3$)$_2$ ligands remain intact on the substrate surface. In addition, a negative absorbance at 3739 cm$^{-1}$ was observed and attributed to the removal of hydroxyl groups from the ALD Al$_2$O$_3$ starting surface. Features in the range of 1125-1450 cm$^{-1}$ are mainly attributed to CH$_3$ deformation and rocking modes. The feature observed at 1575 cm$^{-1}$ indicated the existence of N=C double bonds and may result from β-hydride elimination in the dimethylamido-ligand, i.e., |—N(CH$_3$)$_2$→|—N=CH$_2$+CH$_4$(g). β-hydride elimination between neighboring methyls to release methane has been reported previously for Si(NMe$_2$)$_4$, Ti(NMe$_2$)$_4$, and Ta(NMe$_2$)$_5$ at temperatures above 200° C. This feature was strongest during the early GaS$_x$ ALD cycles, suggesting that the β-hydride elimination may be promoted by the ALD Al$_2$O$_3$ surface. Finally, the features ranging from 891 to 1038 cm$^{-1}$ were ascribed to NC$_2$ stretching modes.

In comparison, the first H$_2$S exposure resulted in the emergence of negative absorbance features corresponding to the removal of CH$_3$ and NC$_2$ to a large extent. However, the magnitude of the decreases from the first H$_2$S exposure were smaller than the corresponding increases from the first Ga$_2$(NMe$_2$)$_6$ exposure, suggesting that some of the dimethylamido-ligands remained. Beginning with the second cycle, however, the difference spectra following the consecutive Ga$_2$(NMe$_2$)$_6$ and H$_2$S exposures appeared symmetric, indicating that the creation and removal of ligands are comparable as predicted by the GaS$_x$ ALD mechanism proposed in Equations 3a and 3b. This was particularly evident for the difference spectra from the 9th cycle. In addition to the spectral features associated with the dimethylamido-ligands, small changes in a feature at ~2400 cm$^{-1}$ were also observed and attributed to the S—H stretch. As expected, the S—H feature increased after the H$_2$S exposures and decreased following the Ga$_2$(NMe$_2$)$_6$ exposures. The normalized integrated absorbances for the C—H and S—H features after each precursor exposure demonstrated that these changes evolved somewhat over the first 5 GaS$_x$ ALD cycles, but stabilized thereafter, suggesting that the GaS$_x$ film had completely covered the ALD Al$_2$O$_3$ starting surface. This finding is consistent with the QCM measurements performed during the GaS$_x$ ALD on the ALD Al$_2$O$_3$ surface that showed an evolution in the ALD GaS$_x$ growth per cycle for the first ~15 cycles (FIGS. 7(a)-7(b)).

In situ QMS measurements were performed to identify and quantify the gas phase products of the GaS$_x$ ALD. First, a comprehensive survey was conducted of all masses between m/z=2-90 to identify the products of the Ga$_2$(NMe$_2$)$_6$ and H$_2$S half reactions. This survey established that dimethylamine (DMA, m/z=45) was the only gaseous product. The FTIR measurements indicated that methane (CH$_4$, m/z=16) is a potential byproduct from β-hydride elimination, but if any CH$_4$ was present, it was below the detection limit. GaS$_x$ ALD was performed at 200° C. using the timing sequence 5-20-10-20 s. Longer purge times were used for the QMS measurements compared to the QCM measurements to allow the DMA QMS signals to stabilize after each exposure and purge. Observations under identical conditions but without the H$_2$S dosing were observed, and revealed that a significant portion of the DMA signal during the $Ga_2(NMe_2)_6$ exposures can be attributed to background signals from the $Ga_2(NMe_2)_6$ precursor. These background signals are likely cracks of the parent compound formed by electron impact inside the QMS. In contrast, the background at m/z=45 was negligible when only the $H_2S$ was dosed. Consequently, a majority of the DMA is released during the $H_2S$ exposures. Under the conditions of the study, a negligible fraction of the Ga precursor is consumed by the ALD surface reactions, and this justifies the subtraction method. This finding can be quantified and compared to the ALD mechanism proposed in Equations 3a and 3b using the QMS product ratio:

$$R' = A/B = x/(3-x) \quad (5)$$

where "A" and "B" are the relative amounts of DMA released during the $Ga_2(NMe_2)_6$ and $H_2S$ exposures, respectively. By integrating and averaging the QMS data, R'=0.11 so that x=0.30 based on Equation 5. The value x=0.30 derived from the QMS measurements compared favorably with the value x=0.32 obtained by QCM, and supported the validity of both methods for extracting mechanistic information for the $GaS_x$ ALD from these in situ measurements.

The mechanism proposed in Equations 3a and 3b assume that pure $Ga_2S_3$ is the solid phase reaction product. However, impurities may result if the surface reactions fail to achieve completion due to steric hindrance or from the limited reactivity of the precursors. Some evidence for this is seen in FTIR difference spectra recorded at the end of each ALD cycle. The net absorbance changes showed some residual C—H features around 1450 cm$^{-1}$ after each complete ALD cycle although the intensity appeared to diminish with increasing $GaS_x$ ALD cycles. Similarly, residual $NC_2$ at 1038 cm$^{-1}$ was seen indicating that C and N impurities exist in the ALD $GaS_x$ films.

Thickness, Structure, and Morphology of ALD $GaS_x$ Films

Film Thickness

Ex situ SE measurements were conducted on ALD $GaS_x$ films prepared on Si(100) substrates with the native oxide intact. These measurements revealed that the growth per cycle (GPC) was higher for the first ~50 cycles compared to the following cycles. This finding is consistent with the QCM measurements (FIGS. 7(a)-7(b)), verifying that $GaS_x$ ALD is substrate-enhanced on oxides. This enhanced growth may stem from a higher reactivity for the Ga precursor on the OH-terminated $SiO_2$ or $Al_2O_3$ as compared to the SH-terminated $GaS_x$. After the first ~50 ALD cycles, the $GaS_x$ grew linearly with increasing cycles. The SE data were converted to GPCs values and these results are shown by the open symbols in FIG. 8 for the temperature range 125-225° C. The inventors were unable to fit the SE data for the films prepared at 250° C. using the $GaS_x$ ellipsometric model, and this fact will be discussed below. The QCM and SE data are in fair agreement, but the SE shows a larger increase in GPC at the lower $GaS_x$ ALD temperatures. This discrepancy can be rectified by considering the refractive index for the ALD $GaS_x$ films.

Figure 9:
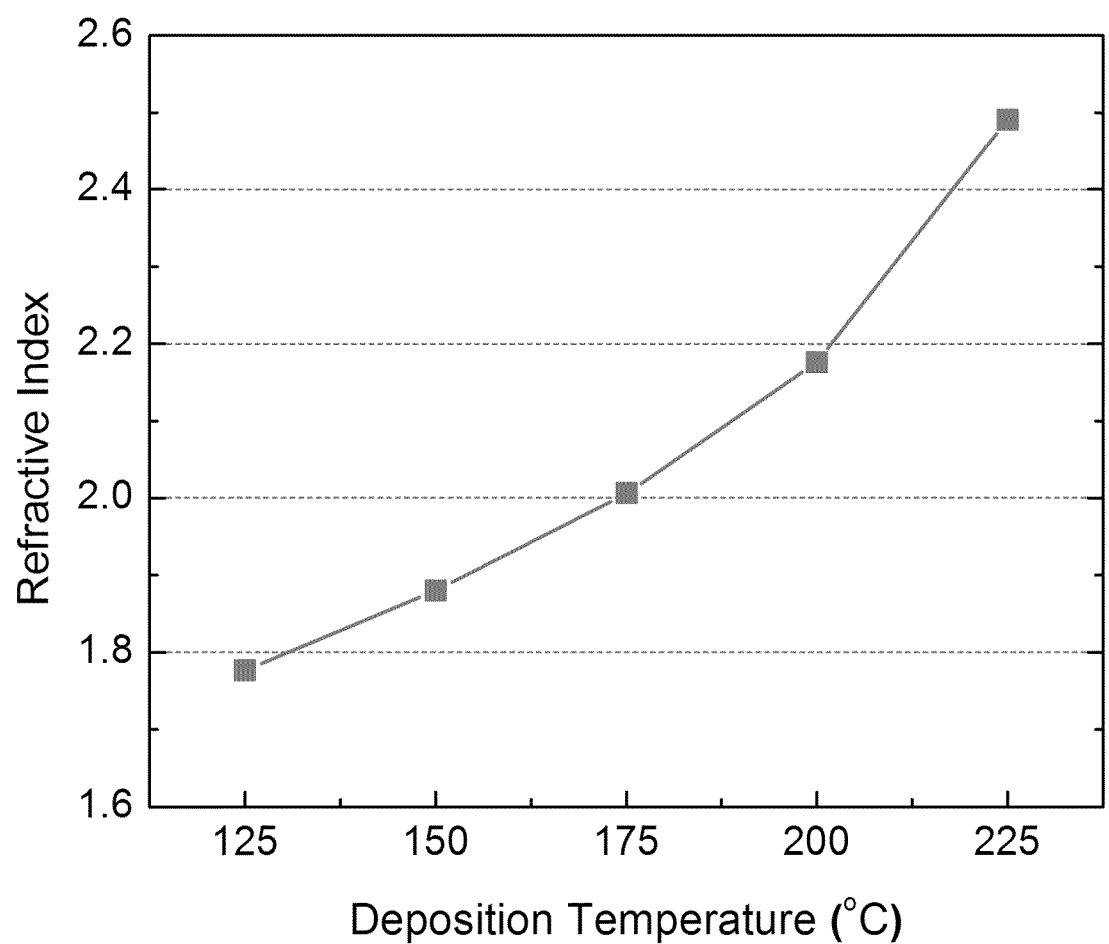
FIG. 9 illustrates a refractive index of ALD GaS$_x$ films versus deposition temperature as measured by ex situ spectroscopic ellipsometry.

FIG. 9 shows that the refractive index at 633 nm increases monotonically with deposition temperature from 125 to 225° C. The refractive index can be considered an indirect measure of density. Consequently, FIG. 9 suggests that the ALD $GaS_x$ density is lower at the lower growth temperatures, and this explains why the mass per cycle values are lower than the corresponding thickness per cycle values at the lower growth temperatures in FIG. 8.

The changes in ALD $GaS_x$ GPC and density with deposition temperature were confirmed using synchrotron-based XRR measurements. XRR was performed on ALD $GaS_x$ films prepared at 125, 150, and 175° C. The thickness, density, and root mean squared (RMS) roughness values were extracted from the XRR data and these values are given in Table 1 below. The density does indeed increase with temperature, supporting the interpretations of the SE measurements above. In addition, the good agreement between the SE and XRR film thickness values lends confidence to both methods for evaluating the ALD $GaS_x$ film thicknesses. The density values fall in the range of 2.67-2.99 g/cm$^3$, which are substantially below the bulk value for GaS (3.86 g/cm$^3$) and also somewhat below the bulk value for $Ga_2S_3$ (3.65 g/cm$^3$). The XRR measurements also demonstrate that the ALD $GaS_x$ films are very smooth when deposited in the temperature range of 125-175° C. as evidenced by the low RMS roughness values in Table 1.

TABLE 1

Film thickness, refractive index, density, and RMS roughness values derived from XRR and SE measurements on ALD $GaS_x$ films deposited at 125, 150, and 175° C.

| | | Growth Temperature (° C.) | | |
|---|---|---|---|---|
| Measurements | | 125° C. (200 cycles) | 150° C. (300 | 175° C. (400 cycles) |
| Film Thickness | SE | 226.7 ± 0.3 Å | 300.2 ± 0.2 Å | 194.7 ± 0.9 Å |
| | XRR | 198.5 ± 0.7 Å | 282.1 ± 1.1 Å | 195.5 ± 2.8 Å |
| Refractive Index | SE | 1.78 ± 0.01 | 1.88 ± 0.01 | 2.01 ± 0.01 |
| Density | XRR | 2.67 ± 0.07 g/cm$^3$ | 2.74 ± 0.18 g/cm$^3$ | 2.99 ± 0.18 g/cm$^3$ |
| RMS Roughness | XRR | 3.08 ± 0.02 Å | 3.12 ± 0.02 Å | 2.35 ± 0.02 Å |

Film Morphology and Nanostructure

AFM and SEM measurements were performed to assess the morphology and nanostructure of the ALD $GaS_x$ films. FIGS. 10(a)-10(c) show the AFM images for the films deposited at 150, 225, and 250° C., respectively. The films prepared at 150 and 225° C. appeared smooth and yielded RMS roughness values of 1.48 and 1.28 Å, respectively. However, at 250° C. the RMS roughness increased dramatically to 169 Å. This very large RMS roughness value is likely the reason that the inventors were not able to model the SE data for this film. SEM images of this rough film (FIG. 10(d)) revealed a porous structure comprised of uniform, spherical nanoparticles with diameters of ~80-100 nm. This dramatic increase in surface roughness and the appearance of a porous morphology at 250° C. suggest that the Ga precursor thermally decomposed at this temperature. Similarly, prior studies observed non-self limiting growth above 275° C. in their study of $Ga_2O_3$ ALD using the same Ga precursor. The inventors suspect that the nanoparticles are mainly comprised of Ga metal. XRD showed this sample to be amorphous (data not shown), but no further analysis was performed on these samples.

ALD $GaS_x$ was deposited on micromachined Si trench wafers with an aspect ratio of 6:1 using 1000 ALD cycles at 150° C. It was evident that the trenches were covered uniformly by the ALD $GaS_x$ film. Furthermore, the film has an identical thickness of 85 nm at the trench top and at the trench bottom.

$GaS_x$ ALD was also performed at 125° C. on a glass capillary array substrate comprised of 20 μm pores with an aspect ratio of 60:1. SEM performed on a cleaved cross sectional specimen revealed that the film was conformal within these high aspect ratio structures.

Composition and Chemical Stability

To evaluate the composition of the ALD $GaS_x$ films, EDX elemental analysis was performed for the films deposited on Si trench structures. As shown in FIG. 12, the EDX measurements revealed that the samples were comprised of Si, Ga, and S. Moreover, EDX mapping showed that the Ga and S were concentrated along the edges of the trench features as expected for a conformal ALD $GaS_x$ film. After the EDX measurements, the ALD $GaS_x$ films were characterized using XRF, RBS, and XPS measurements. The S/Ga atomic ratio was determined using XRF measurements for $GaS_x$ films prepared on Si(100) and fused silica substrates over a range of temperatures between 125 and 250° C. The S and Ga XRF signals were calibrated using ALD ZnS and $Ga_2O_3$ films, respectively, of known molar density prepared using established methods.

Figure 11:
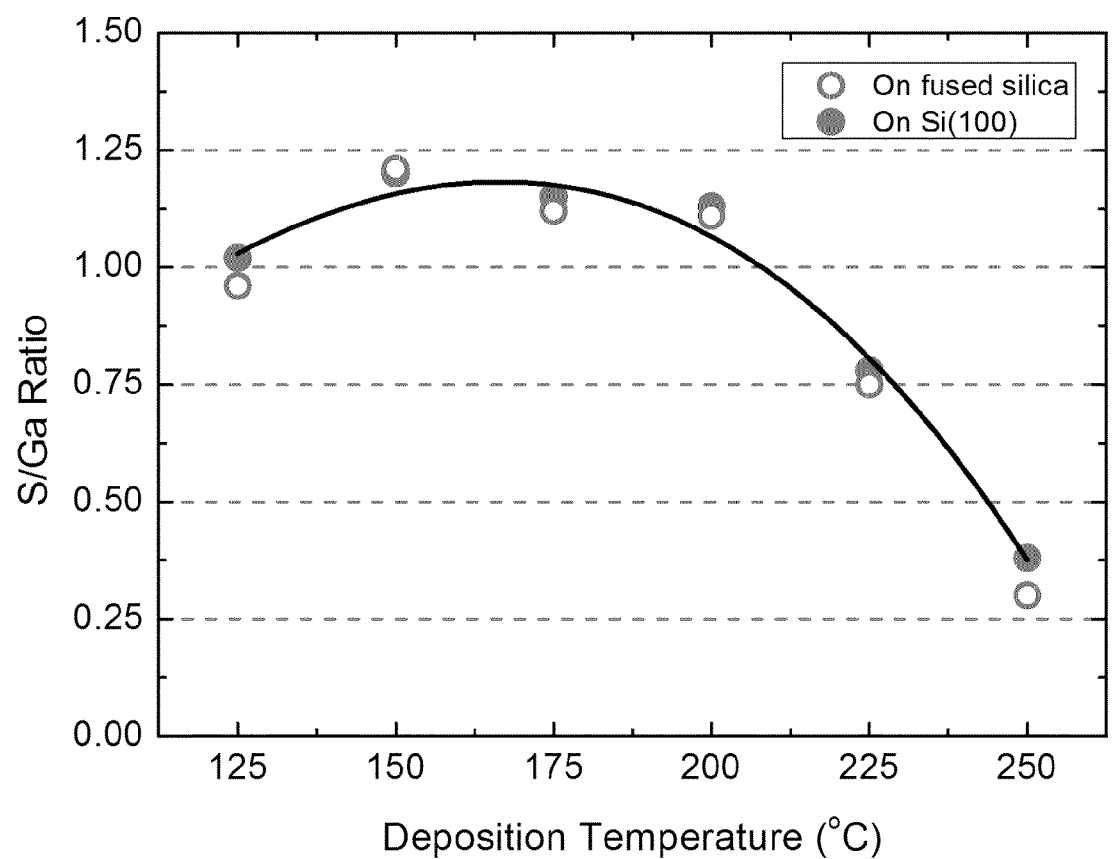
FIG. 11 illustrates XRF measurements of S/Ga atomic ratio versus deposition temperature for ALD GaS$_x$ films deposited on fused silica (open symbols) and Si(100) (closed symbols). The solid line is intended to guide the eye.
Figure 12A:
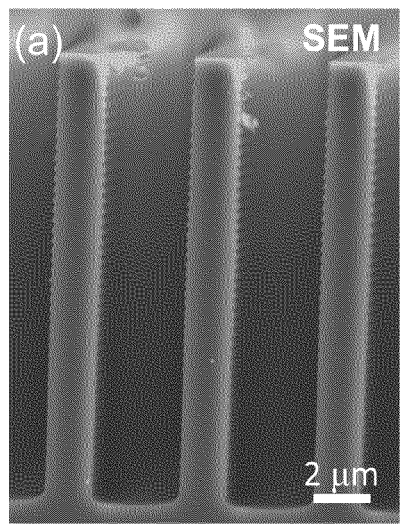
FIG. 12(a) is an SEM image of an EDX analysis of ALD GaS$_x$ film deposited in high aspect ratio Si trench substrate using 1000 cycles at 150° C.
Figure 12B:
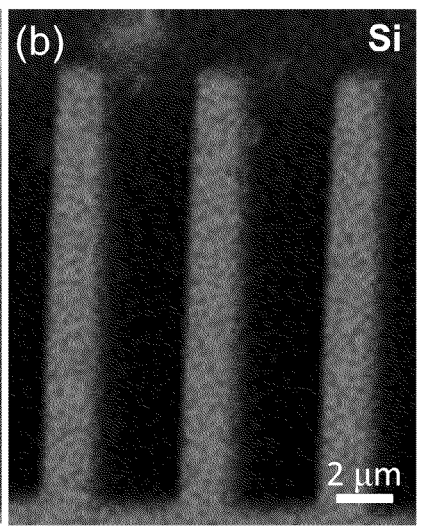
FIG. 12(b) is a Si elemental map of an EDX analysis of ALD GaS$_x$ film deposited in high aspect ratio Si trench substrate using 1000 cycles at 150° C.
Figure 12C:
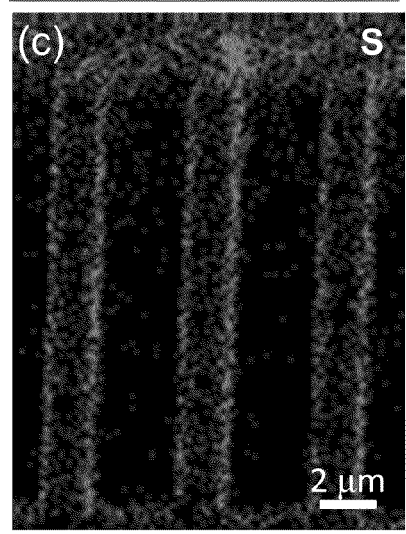
FIG. 12(c) is an S elemental map of an EDX analysis of ALD GaS$_x$ film deposited in high aspect ratio Si trench substrate using 1000 cycles at 150° C.
Figure 12D:
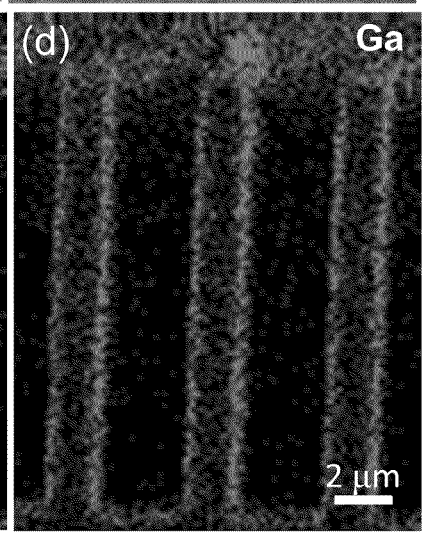
FIG. 12(d) is a Ga elemental map of an EDX analysis of ALD GaS$_x$ film deposited in high aspect ratio Si trench substrate using 1000 cycles at 150° C.
Figure 13A:
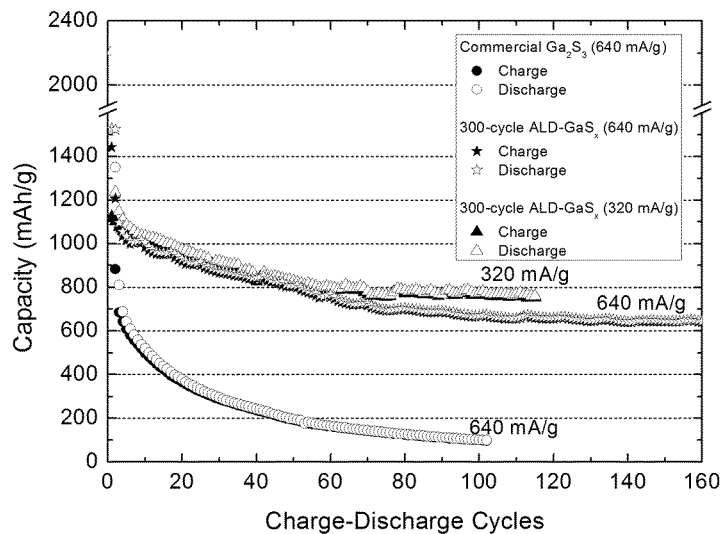
FIG. 13(a) illustrates charge storage capacity versus number of charge-discharge cycles for ALD GaS$_x$ film prepared using 300 ALD cycles on a copper substrate compared to commercial Ga$_2$S$_3$ powder.
Figure 13B:
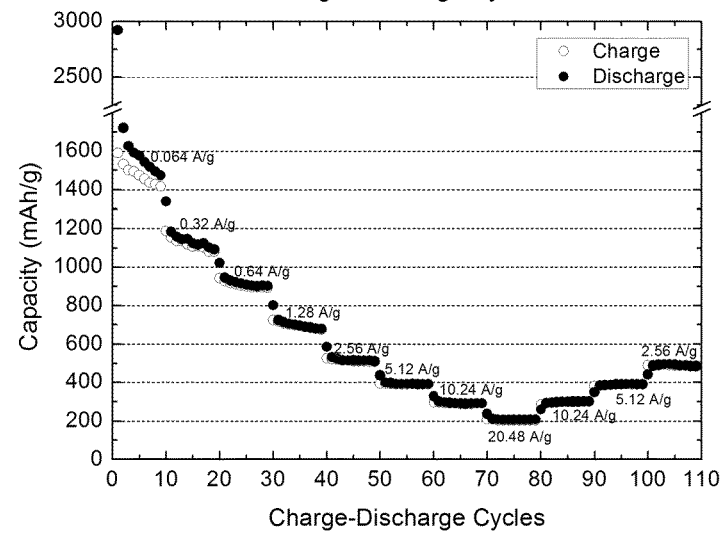
FIG. 13(b) illustrates rate capability of 300-cycle ALD GaS$_x$ film on copper substrate.

As shown in FIG. 11, the S/Ga ratio remained nearly constant at 1.0-1.25 for temperatures between 125-200° C., but decreased at higher temperatures to ~0.3 at 250° C. These S/Ga ratios are between the expected ratios for GaS (S/Ga=1.0) and $Ga_2S_3$ (S/Ga=1.5). The very low S content obtained at 250° C. suggests thermal decomposition of the Ga precursor to form elemental Ga, in agreement with the porous film structure seen by SEM (FIG. 10(d)) Furthermore, the lower S/Ga ratio at 225° C. suggests that some decomposition of the Ga precursor may already occur at this temperature.

XRF measurements were also used to investigate the stability of the ALD $GaS_x$ films upon exposure to atmospheric moisture and liquid water. It was previously reported that both GaS and $Ga_2S_3$ are prone to oxidize under air exposure and even to lose S. The S (2.3 KeV) and Ga (9.2 KeV) XRF intensities were plotted versus air exposure time at room temperature for an 800-cycle ALD $GaS_x$ film prepared on fused silica at 150° C. The Ga intensity was constant with time, but the S signal decreased by 13% within 8 hours, and thereafter remained practically constant over 1 week in air. The constant Ga signal accompanied by a drop in S signal are consistent with the exchange of 0 for S in the top surface of the $GaS_x$ film from atmospheric moisture. For comparison, a 6% drop in S signal was observed when a layer of 200-cycle GaS film prepared at 150° C. was heated for 15 minutes in air at 150° C., indicating that the S exchange is accelerated at higher temperatures. Further evidence for this exchange was observed using XRR measurements. The density of a 400-cycle ALD $GaS_x$ film deposited at 175° C. was seen to increase with time over a 6 hour period, in agreement with the partial conversion of $Ga_2S_3$ (3.65 g/cm³) to $Ga_2O_3$ (6.44 g/cm³).

Next, the inventors attempted to protect the ALD $GaS_x$ from S exchange by depositing a capping layer of 100-cycle ALD $Al_2O_3$ (~13 nm) using TMA and $H_2O$ at 150° C. over the 800-cycle ALD $GaS_x$. The capped sample showed a slightly lower initial S intensity compared to the uncapped sample, suggesting some S exchanged with the $H_2O$ precursor during the $Al_2O_3$ ALD at elevated temperature. After exposure to room temperature air, additional S loss was observed within 4 hours, possibly from $H_2O$ or OH groups within the ALD $Al_2O_3$, or from atmospheric $H_2O$ entering the $GaS_x$ through pinholes in the capping layer. To further examine the effectiveness of the $Al_2O_3$ capping layer, the capped and uncapped samples were immersed in liquid water for 10 minutes. Although the S XRF signal decreased by an additional 8% for the uncapped sample, the ALD $Al_2O_3$ capped sample showed no further S loss indicating that the ALD $Al_2O_3$ formed a barrier against liquid $H_2O$.

Following the XRF studies, RBS was utilized to analyze the composition of two ALD $GaS_x$ films designated S1 and S2. As shown in Table 2, S1 consisted of a Si(100) substrate coated with 800-cycle $GaS_x$ at 150° C., and S2 was Si(100) coated with 800-cycle $GaS_x$ at 200° C. and capped with 100-cycle $Al_2O_3$. The two samples were stored under vacuum prior to RBS characterization to minimize the S exchange with atmospheric moisture identified by XRF. RBS yielded a ratio of S/Ga=1.2 for both samples, consistent with our XRF measurements (FIG. 11). Both samples contained 0, but the 0 concentration was much lower in the $Al_2O_3$-capped sample S2 suggesting that this O impurity originated mostly from inadvertent exposure to the air. Air exposure can change GaS into $Ga_2S_3$ and $Ga_2O_3$, or into $Ga_2O_3$ and elemental S. The 10-nm thick $Al_2O_3$ capping layer did not completely protect these RBS samples.

Considerable C and N impurities were found in the films, which were attributed to residual dimethylamido-ligands from the Ga precursor. These C and N impurities suggested that the reaction between the adsorbed $Ga(NMe_2)$ species and $H_2S$ (Equation 3b) does not proceed to completion. This hypothesis is supported by the FTIR measurements that show a gradual increase in the C—H and C—N features with increasing $GaS_x$ ALD cycles. In terms of C concentrations, the impurities decrease with increasing temperatures, for there was less C in the film deposited at 200° C. than in the film deposited at 150° C. RBS analysis of S2 revealed that the ratios of O/Al and O/Si are 1.5 and 2.0, respectively. Besides the substrate Si(100) coated with native oxide $SiO_2$, two deposited layers of $GaS_{1.2}$ and $Al_2O_3$ were observed. Additionally, two interfaces were identified, $I_A$ between $Al_2O_3$ and $GaS_{1.2}$, and $I_B$ between $GaS_{1.2}$ and $SiO_2$. $I_A$ was much thicker, possibly due to stronger diffusion between $Al_2O_3$ and $GaS_{1.2}$.

TABLE 2

Composition of ALD $GaS_x$ and $Al_2O_3$ films determined using RBS measurements

| Samples* | Layers | | Thickness (Å) | Atomic Concentration | | | | | | | Atomic Ratio | Density (atom/cm³) |
|---|---|---|---|---|---|---|---|---|---|---|---|---|
| | | | | S | Ga | C | N | O | Al | Si | | |
| S1 | Layer 1 | $GaS_x$ | 380 | 29 ± 1 | 23.6 ± 0.5 | 16.4 ± 4 | 13.5 ± 4 | 17.5 ± 3 | — | — | $GaS_{1.2}$ | 8.44 × 10²² |
| | Layer 2 | Si | — | — | — | — | — | — | — | 100 ± 1 | Si | 5.00 × 10²² |

TABLE 2-continued

Composition of ALD GaS$_x$ and Al$_2$O$_3$ films determined using RBS measurements

| Samples* | Layers | Thickness (Å) | Atomic Concentration | | | | | | | Atomic Ratio | Density (atom/cm³) |
|---|---|---|---|---|---|---|---|---|---|---|---|
| | | | S | Ga | C | N | O | Al | Si | | |
| S2 | Layer 1 Al$_2$O$_3$ | 135 | — | — | — | — | 60 ± 1 | 40 ± 1 | — | Al$_2$O$_3$ | 6.68 × 10$^{22}$ |
| | Layer 2 GaS$_x$ | 175 | 44.7 ± 1 | 36.3 ± 1 | 14 ± 4 | — | 5 ± 4 | — | — | GaS$_{1.2}$ | 7.06 × 10$^{22}$ |
| | Layer 3 SiO$_2$ | 10 | — | — | — | — | 66.7 ± 4 | — | 33.3 ± 1 | SiO$_2$ | 6.41 × 10$^{22}$ |
| | Layer 4 Si | — | — | — | — | — | — | — | 100 ± 1 | Si | 5.00 × 10$^{22}$ |

*S1: Si(100) coated with 800-cycle GaS$_x$ at 150° C.; S2: Si(100) coated with 800-cycle GaS$_x$ followed by 100-cycle Al$_2$O$_3$ at 200° C.

An XPS survey scan was conducted on a Si(100) substrate coated with 800-cycle GaS at 200° C. and capped with 100-cycle Al$_2$O$_3$ after removing the capping layer by sputtering. This spectrum showed mainly Ga and S with some C and only a negligible amount of O. This confirmed that the Al$_2$O$_3$-capping provides some protection to the GaS$_x$ against oxygen exchange. The corresponding XPS depth profile for this capped sample clearly revealed the Al$_2$O$_3$ and GaS$_x$ layers. In addition, two interfaces were evident, I$_A$ and I$_B$. The O content of the GaS$_x$ film achieved a minimum value of ~2%, but the C level remained nearly constant at 10% in the GaS$_x$ layer. The Al$_2$O$_3$ capping layer showed an O/Al ratio of ~2.0, while the GaS$_{1.2}$ showed S/Ga of only ~0.5. The higher O/Al and the lower S/Ga ratio were ascribed to the preferential sputtering rates of Al and S. Lower S/Ga ratios have been observed using XPS sputter profiling for CVD grown GaS films.

In contrast to the capped film, XPS depth profiling of an uncapped GaS$_x$ yielded higher O levels throughout the film. High resolution XPS analysis of the Ga and S signals within the GaS$_x$ layer helped to determine their chemical states. The binding energies for Ga 2p$^{3/2}$ and 3d were 1119.2 and 21.1 eV, respectively, indicating Ga in a chemical state of Ga$^{3+}$ [71]. Similarly, the XPS spectrum for S 2s showed a chemical state of S$^{2-}$ [72].

Taken together, the elemental analysis of the ALD GaS$_x$ film combined with the in situ FTIR measurements suggested the following: the film is comprised essentially of Ga$_2$S$_3$, but incomplete reaction of the H$_2$S precursor causes some of the dimethylamido-ligands to remain in the film where they substitute for the S. Consequently, the Ga and S have the expected oxidation states for the Ga$_2$S$_3$ stoichiometry, but the S/Ga ratio is ~1.2, lower than the expected ratio of 1.5. The residual dimethylamido-species may be responsible for the amorphous character of the films. It is possible that much longer H$_2$S exposures may reduce the dimethylamido-content of the films, but evidence for this was not observed in the in situ QCM studies.

Electrochemical Properties

To explore potential applications for the ALD GaS$_x$ films, the electrochemical properties of the materials were evaluated. It has been previously demonstrated that commercial Ga$_2$S$_3$ powder could serve as an anode material for LIBs with an estimated theoretical capacity of 1137 mAh/g. However, that study showed severe capacity fading to a value of ~400 mAh/g after 20 cycles at a current density of 100 mA/g.

300 GaS$_x$ ALD cycles were performed at 150° C. on copper foil substrates and these materials were subsequently tested in the voltage window of 0.01-2.00 V. As a control, commercial Ga$_2$S$_3$ powder was also fabricated into electrodes for electrochemical testing. Under a current density of 640 mA/g, the ALD GaS$_x$ electrode demonstrated a sustained and stable capacity of 650 mAh/g after 160 charge-discharge cycles while the commercial Ga$_2$S$_3$ electrode dropped to around 100 mAh/g after 100 cycles (FIG. 13(a)). Furthermore, using a lower current density of 320 mA/g, the ALD GaS$_x$ exhibited a higher capacity of ~770 mAh/g, two times that of a conventional graphite anode (372 mAh/g). The ALD GaS$_x$ electrode demonstrated a coulombic efficiency of ~99%. In comparison, the commercial Ga$_2$S$_3$ electrode had a coulombic efficiency below 99%. Furthermore, FIG. 13(b). shows that the ALD GaS$_x$ electrode had excellent rate capability, maintaining a capacity of over 200 mAh/g at a current density of ~20 A/g. It is evident that the ALD GaS$_x$ films are a promising anode material for LIBs with high capacity and reliable cyclability.

XRD measurements were performed on ALD GaS$_x$ films prepared on fused-silica substrates at deposition temperatures of 125-225° C. No peaks were observed to indicate crystallinity. Furthermore, annealing the samples at 500° C. for 1 hour yielded no changes in the XRD patterns. It was concluded that the ALD GaS$_x$ films are amorphous, and this helped explain why the film density is lower than expected, and why the RMS roughness was so low.

In summary, gallium sulfide films were deposited by ALD using alternating exposures to Ga$_2$(NMe$_2$)$_6$ and H$_2$S in the temperature range 125-225° C. The growth characteristics and surface reaction mechanism for the GaS$_x$ ALD were investigated using in situ quartz crystal microbalance, quadrupole mass spectrometry, and Fourier transform infrared spectroscopy measurements. The as-deposited films were analyzed for their surface morphology, elemental stoichiometry, chemical states and stability, and crystallinity, using a variety of characterization techniques. The films were smooth, amorphous, and conformal on high aspect ratio substrates. These measurements revealed that the GaS$_x$ growth was self-limiting in the temperature range 125-225° C. and the growth per cycle decreased linearly with increasing temperature from ~1.0 Å/cycle at 125° C. to ~0.5 Å/cycle at 225° C.

In situ QCM, QMS, and FTIR measurements revealed that the growth mechanism proceeds by ligand exchange reactions where a majority of the dimethylamido-groups are released during the H$_2$S exposures. The S/Ga ratio was between 1.0 and 1.2 in the range of 125-200° C., but decreased to 0.75 at 225° C. The Ga and S are in the oxidation states expected for Ga$_2$S$_3$, but the S/Ga ratio of 1.2 is lower than expected due to residual dimethylamido-ligands that remain in the film.

The GaS$_x$ films were amorphous and the refractive index increased from ~1.8 to 2.5 with increasing temperature.

The ALD GaS$_x$ films are relatively inert towards air exposure, and the resistance towards S/O exchange can be further improved using a 10 nm ALD Al$_2$O$_3$ capping layer.

The resultant ALD GaS$_x$ films exhibited excellent electrochemical performance as a LIB anode material, showing high capacity and reliable cyclability compared to commercial $Ga_2S_3$. In particular, electrochemical testing showed that the ALD $GaS_x$ is a promising lithium-ion battery anode material, exhibiting reliable cyclability and a high specific capacity of 770 mAh/g at a current density of 320 mA/g in the voltage window of 0.01-2.00 V.

Gallium Sulfide-Single Walled Carbon Nanotube Composites

The $GaS_x$ ALD was conducted at 150° C. in a custom, viscous flow ALD reactor, comprised of a heated stainless steel tube with an inner diameter of 5 cm and a length of 100 cm. Prior to the $GaS_x$ ALD, single-walled carbon nanotube (SWCNT) powder was loaded into a porous container and placed in the reactor. The reactor was then purged using ultrahigh purity (UHP, 99.999%) nitrogen carrier gas at 300 sccm at a pressure of ~1.0 Torr. The $GaS_x$ ALD was performed using alternating exposures to $Ga_2(NMe_2)_6$ (98%) and 1% $H_2S$ (balanced by $N_2$) with a purging period of pure $N_2$ flow between each exposure. The ALD timing sequence is designated as: $t_1$-$t_2$-$t_3$-$t_4$, corresponding to the durations of the $Ga_2(NMe_2)_6$ exposure, first $N_2$ purge, $H_2S$ exposure, and second $N_2$ purge, respectively, with all times in seconds (s). Two different timing sequences were used in this study: 5-5-5-5 s for coating small quantities (≤5 mg) of SWCNTs, and 120-120-120-120 s for coating larger, 100 mg quantities of SWCNTs. To boost the $Ga_2(NMe_2)_6$ vapor pressure, the solid compound was heated to 100° C. in a temperature-controlled, stainless steel bubbler. The SWCNT samples were typically coated using 50-150 ALD $GaS_x$ cycles to produce films with a thickness of ~2.5 to 11.1 nm.

The SWCNT-$GaS_x$ composites were characterized by using a field emission scanning electron microscope (FE-SEM) equipped with energy dispersive X-ray spectroscopy (EDX) for elemental analysis. Transmission electron microscopy (TEM) was utilized to evaluate the microstructure of the pristine SWCNTs, and to determine the $GaS_x$ coating thickness. In addition, aberration-corrected scanning transmission electron microscopy (STEM) was used to perform high-angle annular dark-field (HAADF) imaging and energy-loss spectroscopy (EELS) elemental mapping of the coated samples.

Synchrotron-based X-ray diffraction (XRD) was used to characterize the crystallinity of the SWCNT-$GaS_x$ composites as well as commercial microsized $Ga_2S_3$ powder, and the pristine SWCNTs. The XRD measurements were conducted at beamline 11-ID-C of the Advanced Photon Source (APS), Argonne National Laboratory (ANL, IL, USA), using an X-ray wavelength of 0.108 Å. Room temperature Raman spectra (Renishaw) were recorded at a resolution of 1 $cm^{-1}$ in back scattering(180°) configuration using 632.8 nm excitation.

The SWCNT-$GaS_x$ composite powder was mixed with Super P carbon black and polyvinylidene fluoride (PVDF) using a ratio of 8:1:1 and dissolved in a N-methyl-2-pyrrolidone (NMP) solvent for fully homogenous mixing. The resultant slurry was cast onto a Cu foil and expanded into a laminate using a 50 μm doctor blade. The laminate was then dried in a furnace at 80° C. within an Ar-filled glove box for 24 hours. Next, the dried laminate was punched into 9/16 inch circular electrodes and subsequently assembled into CR2032 LIB coin cells in an Ar-filled glove box with $H_2O$ and $O_2$ levels below 1 ppm. Li metal was used as the counter/reference electrode, a Celgard 2325 membrane was used as the separator, and 1 M lithium bis (trifluoromethanesulfonyl)imide (LITFSI) in 1,3-dioxolane (DOL) and 1,2-dimethoxyethane (DME) (DOL:DME=1:1 by volume) was used as the electrolyte. The discharge-charge testing was performed on a MACCOR 4200 battery tester using a voltage window of 0.01-2.0 V for the SWCNT-$GaS_x$ electrodes. In addition, control samples were assembled and tested following the same procedures described above using laminates prepared from the commercial SWCNTs and microsized $Ga_2S_3$ powder. All of the electrochemical testing was performed at room temperature.

The uncoated SWCNTs were characterized by SEM and TEM, and found to be comprised of 5-10 nm bundles consisting of 10-100 predominantly single-walled CNTs. FIG. 14(a) shows a TEM image of a pair of neighboring, 1.4 nm SWCNTs, and also a bundle of SWCNTs with an outer diameter of 9 nm. In addition to forming bundles, the SWCNTs have a high concentration of physical defects along their side walls. FIGS. 14(b)-14(d) show TEM images of a small quantity (~5 mg) of the SWCNT sample following 50, 100, and 150 ALD $GaS_x$ cycles, respectively, using the timing sequence 5-5-5-5 s. It is evident that the SWCNTs were uniformly and conformally coated with the ALD $GaS_x$ film to thicknesses of 2.5, 6.4, and 11.1 nm, respectively. It should be noted that pure, individual SWCNTs are generally inert towards ALD chemistry, so that the growth per cycle (GPC) remains near zero for many hundreds of cycles.

In contrast, inventors' SWCNT material yielded relatively high GPC values of 0.5, 0.78, and 0.94 Å/cycle after the 50, 100, and 150 $GaS_x$ ALD cycles, respectively. The expected value for $GaS_x$ ALD is 1.0 Å/cycle at this temperature, indicating that the $GaS_x$ growth is still somewhat inhibited on the SWCNT substrate for the initial 100-150 cycles. The 150 cycle sample was further characterized by STEM imaging (FIG. 14(e)) and by EELS elemental mapping (FIGS. 14(f)-14(i)). FIG. 14(e) reveals that the SWCNT network is uniformly encapsulated by the ALD $GaS_x$ film to form a nanoscale composite material. The EELS maps in FIGS. 14(g)-14(i) correspond to the boxed region in FIG. 14(f), and clearly demonstrate that the coating is uniform and comprised of Ga and S.

Next, 100 mg SWCNT batches were coated with 150 cycles ALD $GaS_x$ using the timing sequence 120-120-120-120 s. The weight of the SWCNTs increased from 100 mg to 335 mg, implying a composition of 70 wt % $GaS_x$. This sample was then characterized using FESEM. By observing the same region of the SWCNT sample before and after the ALD $GaS_x$, it was confirmed that the ALD coating increased the diameter of all of the SWCNTs uniformly, and converted the material from a porous, open powder into a densified composite. EDX mapping of the coated specimen shown in the SEM image was consistent with a uniform $GaS_x$ coating on the SWCNTs. In summary, the $GaS_x$ ALD converted the SWCNTs into a core-shell, SWCNT-$GaS_x$ nanocomposite. Moreover, these materials can be fabricated in sufficient quantities for electrochemical evaluation.

The bare SWCNT and the SWCNT-$GaS_x$ composite materials, as well as the commercial $Ga_2S_3$, were further characterized using XRD and Raman measurements. As expected, XRD showed the commercial $Ga_2S_3$ to be a crystalline α-$Ga_2S_3$. In contrast, both the SWCNTs and the SWCNT-$GaS_x$ composite appeared relatively featureless by XRD, with the exception of a broad, weak peak at 26.8° for the two, consistent with the (002) plane of graphite. There also appeared to be a broad, weak peak at 19° for the SWCNT-$GaS_x$ composite sample that corresponds to the (~202) feature for α-$Ga_2S_3$. Raman measurements of the SWCNTs and the SWCNT-$GaS_x$ composite exhibited more structure, as expected based on the greater sensitivity of Raman to short-range order. The following characteristic features of SWCNTs were observed: the radial breathing mode (RBM) at 218, 254, and 280 $cm^{-1}$, D band at 1303 cm$^{-1}$, G band at 1552 and 1591 cm$^{-1}$, M band at 1720 and 1920 cm$^{-1}$, and G band at 2607 cm$^{-1}$. The RBM at 218 cm$^{-1}$ indicated the presence of bundles, while the RBM features at 254 and 280 cm$^{-1}$ revealed the semiconducting nature of SWCNTs. This property is also supported by the characteristic splitting of the G band. Furthermore, the presence of the D band implies an abundance of defects, consistent with the facile nucleation of the GaS$_x$ ALD, which relies on defect sites on the SWCNT surface. For isolated SWCNTs, the correlation between nanotube diameter ($d_t$) and breathing mode frequency ($_{RBM}$ is $d_t$=248 cm$^{-1}$ nm/$_{RBM}$ cm$^{-1}$. The appearance of RBM features at 254 and 280 cm$^{-1}$ implies nanotube diameters of 1.0 and 0.9 nm, in fair agreement with the TEM measurements (FIG. 14($a$)).

Raman spectra of the commercial Ga$_2$S$_3$ were consistent with crystalline Ga$_2$S$_3$. The dominant peaks at 233 and 386 cm$^{-1}$ are due to the $v_4$ and $v_1$ modes of the GaS$_4$ molecular unit, respectively. In addition, the features at 114, 140, 147, 307, 329, 340, 350, and 422 cm$^{-1}$ are also characteristic of crystalline Ga$_2$S$_3$.

Raman spectra of the SWCNT-GaS$_x$ composite showed all of the peaks present in the SWCNT spectrum, and new peaks appearing at ~150, 165, 175, 220, 310, and 385 cm$^{-1}$. The peaks at 150, 310, and 385 cm$^{-1}$ are also present in the Ga$_2$S$_3$ spectrum, and the peak at 220 cm$^{-1}$ might be a red-shifted version of the very intense 233 cm$^{-1}$ feature for Ga$_2$S$_3$. This red-shift might result from a substitution of S in the GaS$_4$ units with heavier dimethylamido-ligands (—N(CH$_3$)$_2$) that exist as impurities in the ALD GaS$_x$ films. Peaks at 2878 and 2941 cm$^{-1}$ for the composite that appeared in the Ga$_2$S$_3$ spectrum were also observed, but were not previously reported. The Raman spectrum for the SWCNT-GaS$_x$ composite was clearly different from the uncoated SWCNT, and had some of the features expected for Ga$_2$S$_3$.

Following synthesis and characterization, the SWCNT-GaS$_x$ composite was electrochemically tested, along with the SWCNT and Ga$_2$S$_3$ standards, to evaluate their performance as LIB anode materials. During the first five charge-discharge cycles for the commercial Ga$_2$S$_3$, there was a large plateau at ~1.0 V with the 1$^{st}$ discharge (reduction, or lithiation) profile, mainly attributed to lithiation of the Ga$_2$S$_3$ electrode. In addition, there was another declining plateau at ~0.2 V in the 1$^{st}$ discharge. In the subsequent 1$^{st}$ charge (oxidation, or delithiation), three increasing plateaus were seen at ~0.2, 0.8, and 1.6 V. The total 1$^{st}$ discharge capacity was 1334 mAh/g, higher than the theoretical capacity of 1137 mAh/g. This discrepancy was attributed to the formation of a solid electrolyte interphase (SEI), which consumed extra current and lithium ions. In the subsequent 1$^{st}$ charge, the capacity reached 880 mAh/g with the gradually increasing potential to 2.0 V. Apparently, there is an irreversible capacity of >450 mAh/g after the 1$^{st}$ cycle. Beginning with the 2$^{nd}$ discharge, the plateau at ~1.0 V disappeared but two new plateaus appeared at ~1.2 and ~0.8 V. In addition, the plateau at 0.2 persisted. In contrast, the 2$^{nd}$ and following charge profiles showed similar behaviors to the 1st one, but their plateaus evolved with increasing cycles.

The discharge and charge capacities for the commercial Ga$_2$S$_3$ continuously decreased in the first five cycles. However, the dQ/dV curves further disclose that the reduction and oxidation peaks continued to evolve with extended testing up to 50 cycles. An evident phenomenon is that all of the reduction and oxidation peaks reduced in intensity. In particular, the peaks at >1.0 V almost disappeared after the first 20 cycles, implying a continuous decline in redox and therefore significant irreversible capacity fading. Obviously, the commercial Ga$_2$S$_3$ cannot sustain stable electrochemical cycling, and is unsuitable as a LIB anode material.

SWCNTs have been widely investigated as LIB anodes in previous studies. They possess a high theoretical surface area of 2630 m$^2$/g as a result of their small size and hollow core. The 1$^{st}$ discharge profile of the SWCNTs exhibited a declining plateau at ~0.8 V and reached a capacity of 1586 mAh/g. The subsequent 1$^{st}$ charge profile showed an increasing plateau at 1.2 V and reached a total capacity of 222 mAh/g. The irreversible capacity of >1300 mAh/g was commonly attributed to the formation of the SEI on the SWCNTs, and the large value reflected the very high surface area. Beginning with the 2$^{nd}$ charge-discharge cycle, the capacity fading became progressively smaller over the first five cycles. The corresponding dQ/dV profiles clearly showed a reduction peak at 0.8 V in the first discharge that disappears in the following discharges, consistent with the extensive SEI formation in the 1$^{st}$ discharge. Another reduction peak appeared at ~0.02 V, which gradually decreased and stabilized after several tens of cycles. In the 1$^{st}$ oxidation, peaks were seen at 0.3, 1.2, and 2.0 V. With increasing cycles, only the 0.02 V reduction peak remained, while the oxidation peaks stabilized at 0.1 and 1.98 V. The charge-discharge performance of the SWCNTs stabilized with cycling, but this material provided only a limited capacity of <200 mAh/g, as previously observed.

The charge-discharge profiles for the first 5 cycles of the SWCNT-GaS$_x$ composite exhibited some of the characteristics of both the Ga$_2$S$_3$ and the SWCNTs components. In the 1$^{st}$ discharge, the composite reached a capacity of 2118 mAh/g, and showed a declining plateau at ~0.88 V. The subsequent 1$^{st}$ charge showed three increasing plateaus at ~0.2, 0.8, and 1.6 V, achieving a capacity of 810 mAh/g. Thus, the irreversible capacity was ~1300 mAh/g, most probably from SEI formation on the high surface area of the composite. In the following cycles, the capacities gradually decreased but much more slowly compared to the commercial Ga$_2$S$_3$. The dQ/dV profiles clearly showed two reduction peaks at 0.88 and 0.02 V, and four oxidation peaks at 0.36, 0.89, 1.2, and 1.6 V in the first reduction and oxidation, respectively. The peaks stabilized at 0.66 and 0.02 V for reduction, and at 0.2, 0.45, 0.8, and 0.86 V for oxidation. In comparison, the SWCNT-GaS$_x$ composite demonstrated much better performance than the commercial Ga$_2$S$_3$ and the SWCNTs.

Figure 15A:
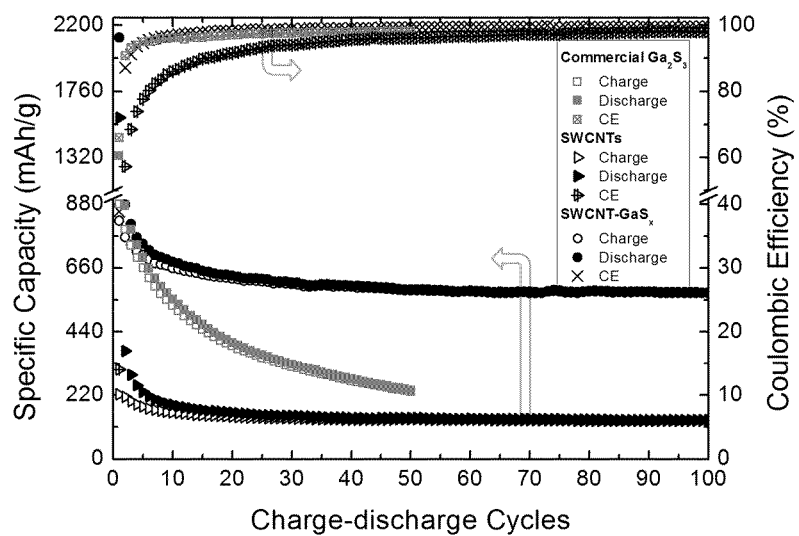
FIG. 15(a) illustrates the cycling performance and columbic efficiency for commercial Ga$_2$S$_3$, commercial SWCNTs, and SWCNT-GaS$_x$ composite at 120 mA/g.

To directly compare the performance of the three materials, their cyclability and columbic efficiency data are plotted together in FIG. 15. Using a current density of 120 mA/g, both the SWCNTs and the SWCNT-GaS$_x$ exhibit exceptional cyclability over 100 cycles (FIG. 15($a$)). Although both showed a rapid capacity decrease during the initial 10 cycles, this behavior diminished so that after ~30 cycles the capacity became nearly constant. As a consequence, the SWCNTs maintained a discharge capacity of 130 mAh/g while the SWCNT-GaS$_x$ composite sustained a capacity of 575 mAh/g at the 100$^{th}$ cycle. In contrast, capacity of the commercial Ga$_2$S$_3$ dropped continuously to be only 230 mAh/g at the 50$^{th}$ cycle.

Figure 15B:
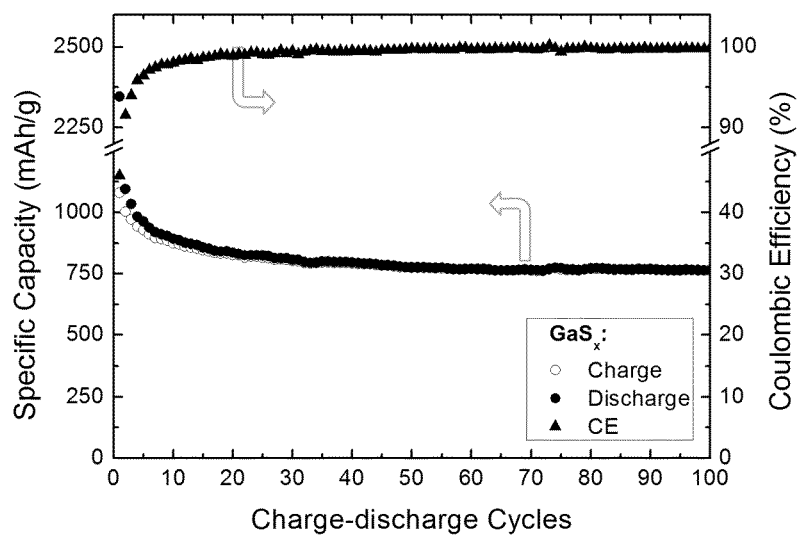
FIG. 15(b) illustrates the cycling performance and columbic efficiency for the GaS$_x$ component of the SWCNT-GaS$_x$ composite at 120 mA/g.

The SWCNT-GaS$_x$ composite demonstrated the best combination of specific capacity and capacity retention in FIG. 15($a$). In addition, the SWCNT-GaS$_x$ showed the highest columbic efficiency of the three materials, amounting to 99.7% at the 100$^{th}$ cycle compared to 98% for both the SWCNTs at the 100$^{th}$ cycle and the commercial Ga$_2$S$_3$ at the 50$^{th}$ cycle (FIG. 15($a$)). From the SWCNT-GaS$_x$ composite data in FIG. 15($a$) and the known composition of the composite, the capacity arising solely from the GaS$_x$ was determined, and this data is presented in FIG. 15(b). The ALD GaS$_x$ exhibited very reliable cyclability and a capacity of 766 mAh/g at the 100$^{th}$ cycle, a value two times higher than graphite (372 mAh/g). In addition, the columbic efficiency reached 99.8% at the 100$^{th}$ cycle.

To explore the rate capability of the SWCNT-GaS$_x$ composite, a higher current density of 600 mA/g was used (five times that of FIG. 15). In contrast to the continuous capacity fading for the commercial Ga$_2$S$_3$ at this higher current, the SWCNT-GaS$_x$ demonstrated a much slower capacity fading in the first 30 cycles, and then gradually stabilized at a sustained value of 514 mAh/g at the 100$^{th}$ cycle. Once again, the SWCNT-GaS$_x$ composite showed much better columbic efficiency compared to the commercial Ga$_2$S$_3$, amounting to 99.7% for the composite and ~98% for the commercial Ga$_2$S$_3$. In conclusion, the SWCNT-GaS$_x$ composite has a very good rate capability.

The excellent performance of the SWCNT-GaS$_x$ composite can be attributed to synergic effects that arise from combining the SWCNTs and GaS$_x$ constituents at the nanoscale. In the first place, GaS$_x$ is an insulator with a relatively high Li storage capacity, while the SWCNTs have a very high conductivity but only a modest Li storage capacity. Consequently, combining the two materials provides the optimal combination of high electrical conductivity and capacity. Second, the very thin (~10 nm) GaS$_x$ coating ensures rapid electrical and Li-ionic transport, both of which benefit the capacity and rate properties. Third, the amorphous structure of the ALD GaS$_x$ can minimize the loss of structural integrity from volume changes that generally accompanies conversion reactions in metal sulfides. Fourth, the continuous SWCNT network can provide both high electrical conductivity, and structural reinforcement to the composite to minimize stress-induced deterioration during cycling. In contrast, the commercial Ga$_2$S$_3$ is crystalline and micro-sized, and lacks the conductive support to accommodate stress and improve electrical transport. On the other hand, the SWCNTs suffer from a relatively low capacity, similar to graphite.

In summary, gallium sulfide (GaS$_x$, x=1.2) thin films were deposited by atomic layer deposition (ALD) onto single-walled carbon nanotube (SWCNT) powders. The ALD GaS$_x$ was performed at 150° C., and produced uniform and conformal amorphous films. The ALD of GaS$_x$ thin films on a SWCNT support yields a nano-composite material comprised of a conductive carbon core encapsulated by a uniform and conformal, amorphous, GaS$_x$ shell. This material demonstrated exceptional electrochemical performance in charge-discharge testing of LIBs, with a high specific capacity, stable cycling behavior, and excellent columbic efficiency. In particular, the resulting core-shell, nanostructured SWCNT-GaS$_x$ composite exhibited excellent electrochemical performance as an anode material for lithium-ion batteries (LIBs), yielding a stable capacity of ~575 mAh/g at a current density of 120 mA/g in the voltage window of 0.01-2 V, and an exceptional columbic efficiency of >99.7%. The GaS$_x$ component of the composite produced a specific capacity of 766 mAh/g, a value two times of that of conventional graphite anodes. The excellent electrochemical performance of the composite is attributed to four synergistic effects: (1) The uniform and conformal ALD GaS$_x$ coating offers short electronic and Li-ion pathways during cycling; (2) The amorphous structure of the ALD GaS$_x$ accommodates stress during lithiation-delithiation processes; (3) The mechanically robust SWCNT framework also accommodates stress from cycling; (4) The SWCNT matrix provides a continuous, high conductivity network.

In The results indicate that the SWCNT-GaS$_x$ composite is a promising, high-performance anode material that could replace conventional graphite anodes. In the future, the SWCNT-GaS$_x$ composites might be optimized to serve this role by: 1) Adjusting the GaS$_x$ fraction to achieve the best balance of capacity and conductivity; 2) Utilizing graphitic frameworks with tailored pore sizes to facilitate transport from the electrolyte; and 3) Optimizing the porosity and void space to best accommodate stress induced by volume changes.

Li$_x$Ga$_y$S$_z$ ALD Process

Figure 16A:
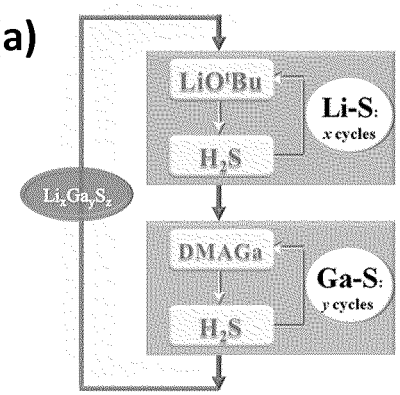
FIG. 16(a) illustrates the ALD route for synthesizing superionic sulfide-based inorganic electrolytes. In particular.

Li$_x$Ga$_y$S$_z$ was prepared by combining Li$_2$S ALD (using LTB and 1% H$_2$S as precursors) and Ga$_2$S$_3$ ALD (using Ga$_2$(NMe$_2$)$_6$ and 1% H$_2$S as precursors) process at 150-225° C. In other embodiments, any of the other lithium or gallium precursors described above may be used. By adjusting the ratio of individual ALD cycles for Li$_2$S and Ga$_2$S$_3$ (see FIG. 16(a)) the resultant LiGa$_x$S$_y$ can be deposited having any atomic ratio of Li to Ga in order to secure the optimal properties for different applications. The underlying growth mechanism can be interpreted using the following surface reactions:

(6a)

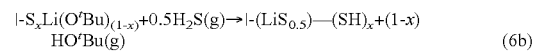
(6b)

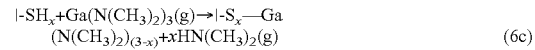
(6c)

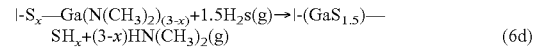
(6d)

Figure 16B:
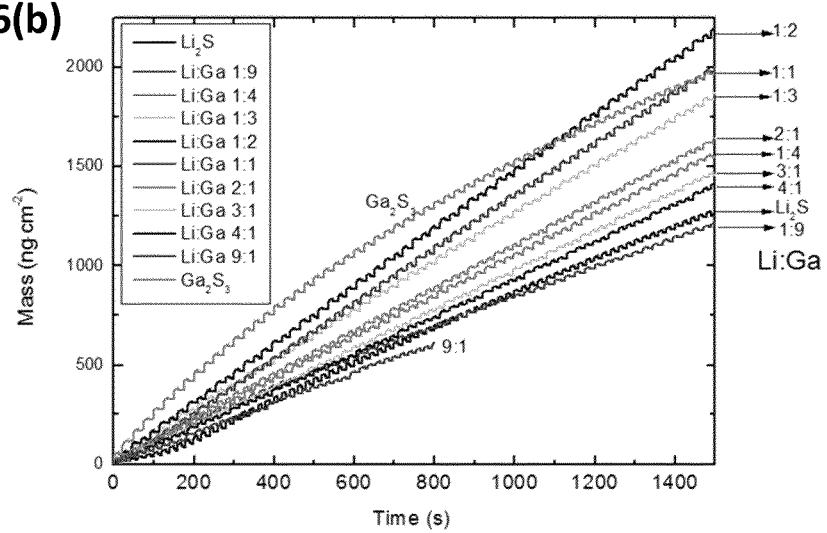
FIG. 16(b) illustrates QCM profiles for tunable Li$_x$Ga$_y$S$_z$.

The Li$_x$Ga$_y$S$_z$ ALD growth was investigated using QCM (see FIG. 16(b)). In FIG. 16(b) it is demonstrated that the Li$_x$Ga$_y$S$_z$ ALD could linearly proceed in any cycle ratio of ALD Li$_2$S (with a timing sequence of 5-5-5-5 s) and Ga$_2$S$_3$ (with a timing sequence of 5-5-10-5 s) at 200° C.

Al$_2$S$_3$ and Li$_x$Al$_y$S$_z$ ALD Processes

Al$_2$S$_3$ ALD Process

Al$_2$S$_3$ was synthesized by ALD, using tris(dimethylamido)aluminum (TDMA-Al, Al$_2$(NMe$_2$)$_6$) and 1% H$_2$S. TDMA-Al was heated to 80° C. for securing sufficient vapor supply. QCM measurements demonstrated that a timing sequence of 5-5-10-5 s (dosing TDMA-Al, purging, dosing H$_2$S, and purging) is necessary for accomplishing saturation growth of Al$_2$S$_3$. However, other aluminum precursors such as tris(dimethylamido)aluminum, tris(diethylamido)aluminum, tris(ethyl-methylamido)aluminum, aluminum(III) acetylacetonate, tris(2,2,6,6-tetramethyl-3,5-heptanedionato)aluminum(III), aluminum(III) hexafluoroacetylacetonate, or trimethylaluminum may be used. The underlying growth mechanism can be described using the following two half-reactions:

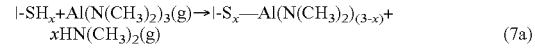
(7a)

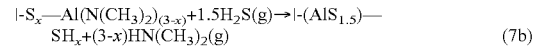
(7b)

in which the symbol "|-" represents the surface, and the monomeric Al compound is used for simplicity. In Equation 7a, the Al compound reacts with x thiol (—SH) groups liberating x of the three dimethylamino-ligands into the gas phase. In Equation 1b, the H$_2$S removes the remaining (3-x) dimethylamino-ligands into the gas phase to form stoichiometric Al$_2$S$_3$ and repopulate the surface with thiols. These equations assume that thiol groups are the reactive species responsible for chemisorption of the Al compound, and that the resulting film has the $Al_2S_3$ stoichiometry.

Figure 17:
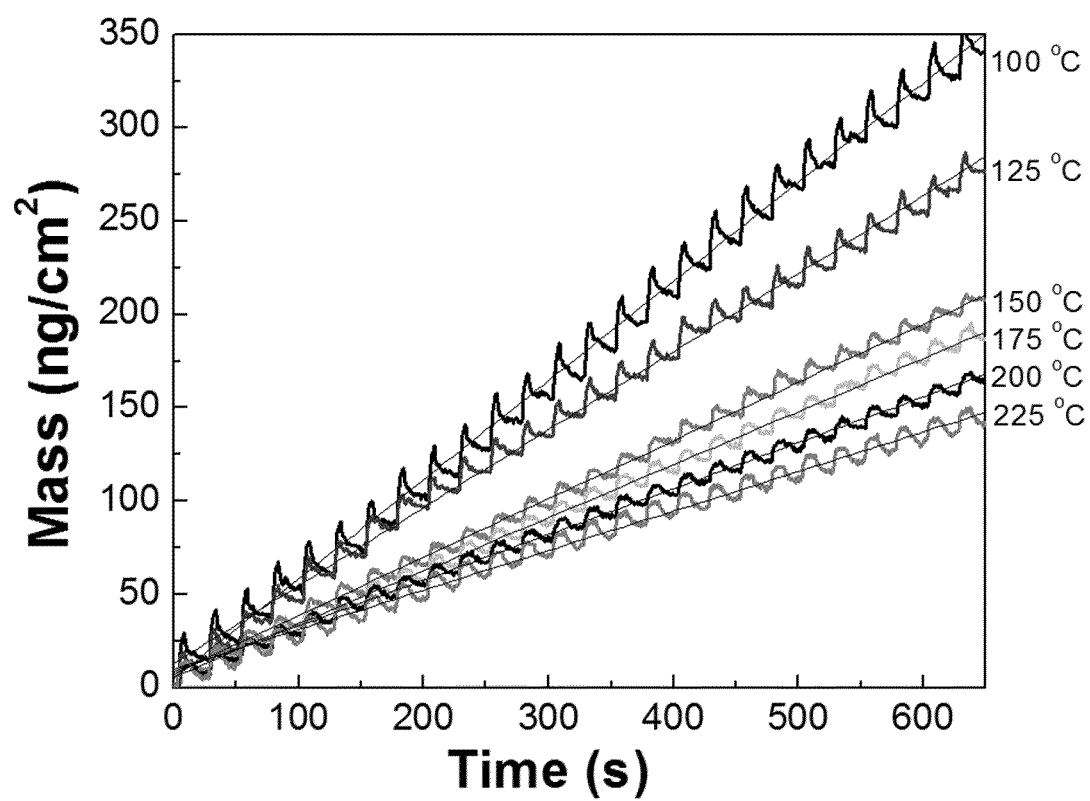
FIG. 17 illustrates in situ QCM measurements of ALD Al$_2$S$_3$ at different temperatures using the timing sequence 5-5-10-5 s.
Figure 18:
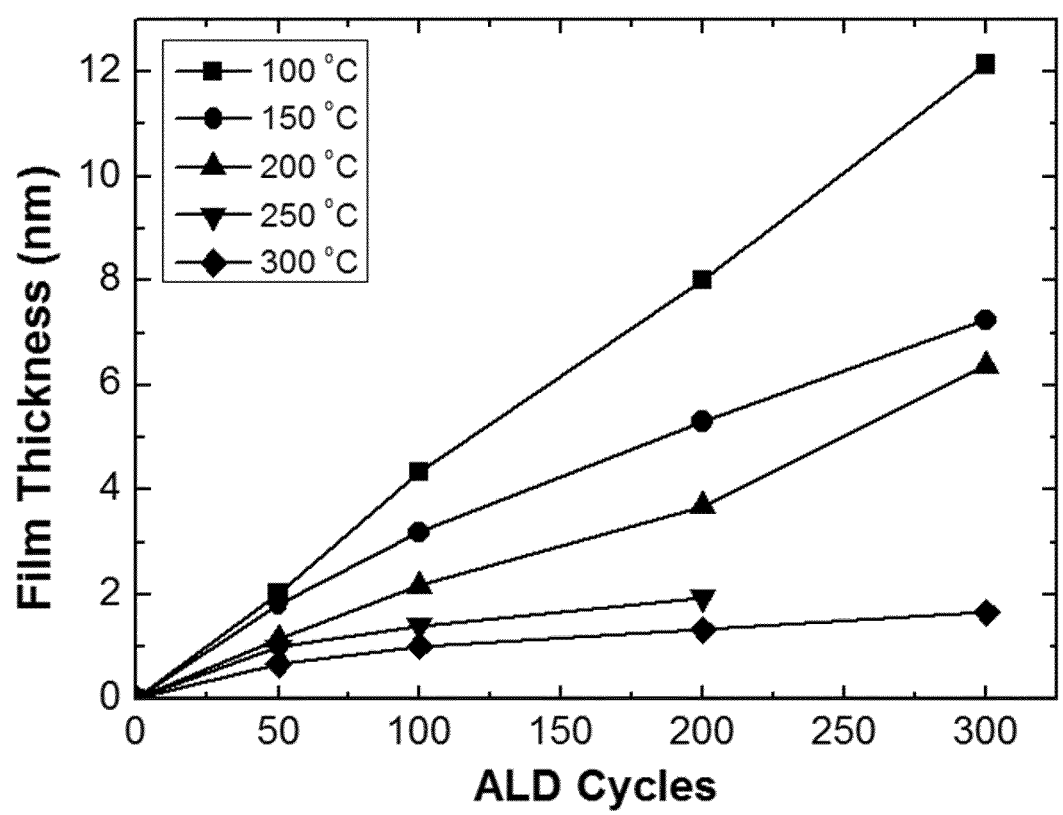
FIG. 18 illustrates growth characteristics of ALD Al$_2$S$_3$ with ALD cycles in the temperature range of 100-300° C., as measured by ex situ spectroscopic ellipsometry.
Figure 19:
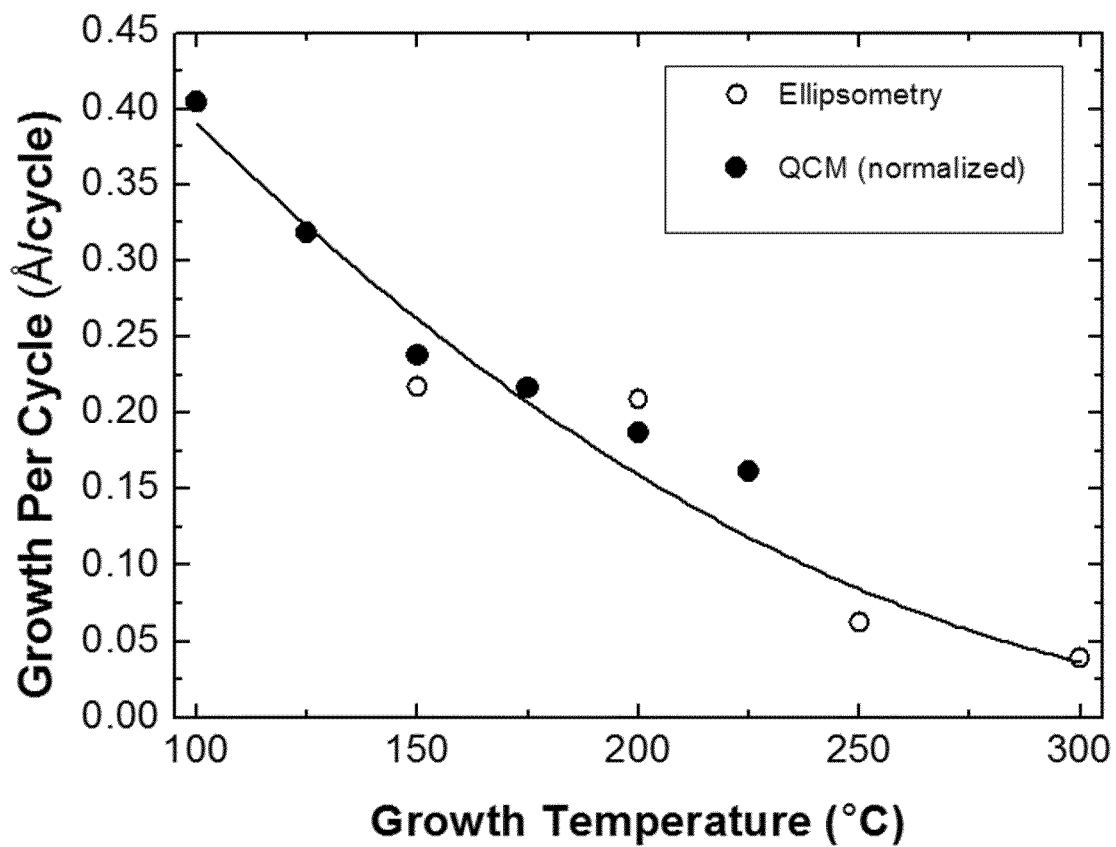
FIG. 19 illustrates growth per cycle (GPC) of ALD Al$_2$S$_3$ with temperature, as measured by ex situ spectroscopic ellipsometry and QCM.
Figure 21:
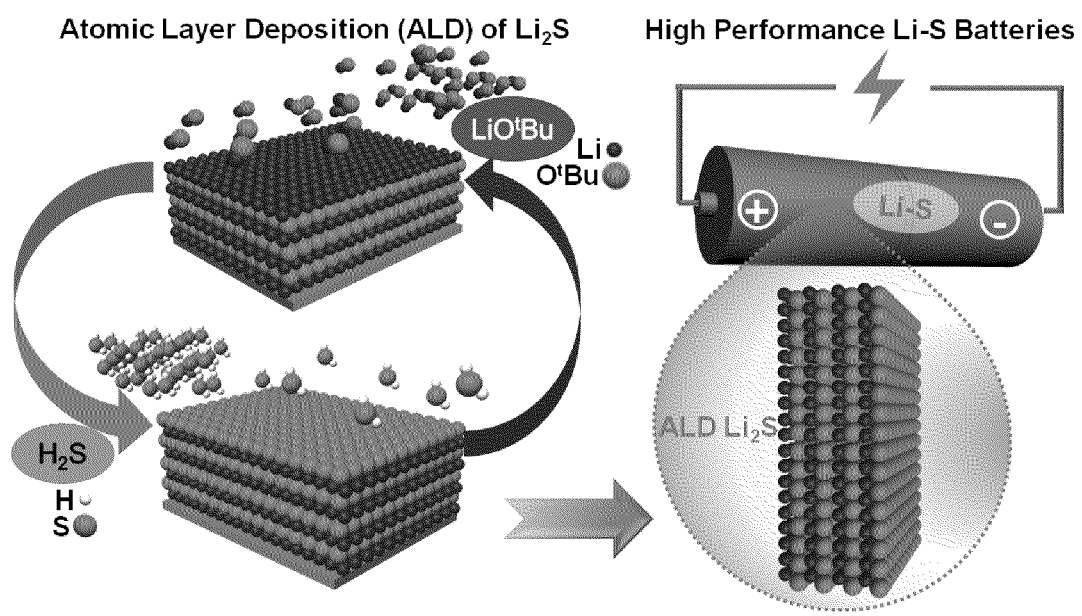
FIG. 21 illustrates the synthesis of nano-Li$_2$S using a vapor-phase atomic layer deposition (ALD) via alternating exposures to lithium tert-butoxide (LTB, LiOC(CH$_3$)$_3$) and hydrogen sulfide (H$_2$S).

In the temperature range of 100-300° C., in situ QCM shows that ALD $Al_2S_3$ grows linearly with increasing deposition cycles (see FIG. 17). This was verified by ex situ measurements of spectroscopic ellipsometry (see FIG. 18). QCM and spectroscopic ellipsometry together disclosed that the growth per cycle (GPC, i.e., growth rate) nearly linearly decreased with temperature from ~0.4 Å/cycle at 100° C. to ~0.03 Å/cycle at 300° C. (see FIG. 19). Typical thicknesses relevant to batteries are in the range of 1-1000 nm, and would be produced using approximately 25-25000 ALD $Al_2S_3$ cycles at a deposition temperature of 100° C.

$Li_xAl_yS_z$ ALD Process $Li_xAl_yS$, was prepared by combing the $Li_2S$ ALD (using LTB and 1% $H_2S$ as precursors) and the $Al_2S_3$ ALD (using TDMA-Al and 1% $H_2S$ as precursors) process. The combined ALD process of $Li_xAl_yS$, is similar to the ALD process for $Li_xAl_yS_z$. By adjusting the ratio of individual ALD cycles for $Li_2S$ and $Al_2S_3$, the resultant $LiAl_xS_y$, can be deposited having any atomic ratio of Li to Al in order to secure the optimal properties for different applications. The underlying growth mechanism can be interpreted using the following surface reactions:

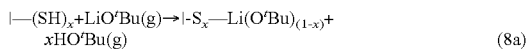

(8a)

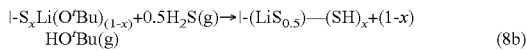

(8b)

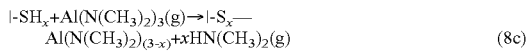

(8c)

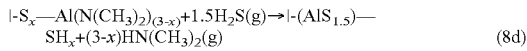

(8d)

$Li_xAl_yS$, nanofilms are very promising as protective coatings of superionic conductivity to inhibit the dendrite growth of Li metal (see FIG. 20). In comparison to the uncoated and $Al_2S_3$-coated Cu foils in the Li/Cu cells, the $Li_xAl_yS_z$-coated Cu foils showed much better Coulombic efficiency (CE). In particular, the $Li_xAl_yS_z$-coated Cu foils exhibited thickness-independent behavior, implying $Li^+$ superionic conductivity using both the coated Li and Cu foil in the Li/Cu cell. In addition, the cell CE did not worsen, which further evidenced the superionic conductivity of the $Li_xAl_yS_z$ films. In FIG. 20, the $Li_xAl_yS$, films were deposited using the repetition of one-cycle $Li_2S$ and one-cycle $Al_2S_3$ at 150° C. Due to the different GPCs of $Li_2S$ (~1.1 Å/cycle) and $Al_2S_3$ (~0.25 Å/cycle) at 150° C., the ratio of Li to Al is believed to be ~5, being lithium-rich.

Superionic Sulfide-Based Solid State Inorganic Electrolytes for High Energy Lithium-Based Batteries Many of the drawbacks of current LIBs relate to the use of liquid organic electrolytes. For instance, liquid organic electrolytes are responsible for the formation of the solid state interphase (SEI) that consumes extra Li and reduced sustainable capacity of LIBs. In Li—S batteries, liquid electrolytes dissolve intermediate polysulfides, leading to the shuttling of active materials to the Li anode and subsequent battery failure. On the other hand, $Li—O_2$ batteries are easy to lose liquid electrolytes due to their high vapor pressure and therefore need to be compensated by excess solvent. In particular, liquid electrolytes pose serious safety concerns for large bulk-type batteries used for electric vehicles (EVs), for their flammable nature is more vulnerable with increasing volume in large batteries. In this context, new solutions are undergoing intensive investigation and solid-state inorganic electrolytes are attracting great interest due to their manifold benefits over their liquid organic counterparts: (1) thermal, chemical, and electrochemical stability; (2) high resistance to shocks and vibrations; (3) absence of leakage and pollution; (4) improved battery cycleability; and (5) enabling Li metal as anode.

Among solid-state inorganic electrolytes, oxide and sulfide compounds are most widely investigated. In comparison to oxide-based inorganic electrolytes, sulfide-based ones are more attractive in ionic conductivity and can extensively reach a conductivity $>10^{-4}$ S/cm at room temperature. More excitingly, recent studies reported a series of superionic Li conductors serving as solid-state electrolytes in replacing liquid electrolytes in batteries. A Japanese team fabricated a $Li_2S$—$GeS_2$—$P_2S_5$ compound, $Li_{10}GeP_2S_{12}$, showing a conductivity of $1.2 \times 10^{-2}$ S/cm. A German group developed another $Li_2S$—$SnS_2$—$P_2S_5$ electrolyte, $Li_{10}SnP_2S_{12}$ exhibiting a conductivity of $0.7 \times 10^{-2}$ S/cm at 27° C., while a latest study disclosed that a glass-ceramic compound of $Li_2S$—$P_2S_5$ reaches $1.7 \times 10^{-2}$ S/cm at room temperature. Given the facts that traditional liquid organic electrolytes are of the order of $10^{-3}$-$10^{-2}$ S/cm at room temperature, it is inspiring to conclude that inorganic sulfide-based compounds could reach and even exceed the conductivity of liquid electrolytes. Thus, sulfide-based compounds hold great promise in replacing liquid electrolytes to improve lithium-based batteries in stability, cost, and safety.

Solid-state electrolytes can be categorized into gel, organic polymer, organic-inorganic hybrids, and inorganic materials. In comparison, the inorganic ones are more advantageous in many ways as stated above, ascribed to their combination of fast ion mobility and the robust mechanical properties of a solid. The main impediment is finding an appropriate solid electrolyte that has a reasonably high lithium ionic conductivity and a good chemical stability in contact with both electrodes.

The fabrication of inorganic electrolytes was mainly fulfilled by melt quenching, mechanical milling, and solid state reaction. Sulfide-based compounds have a number of benefits over oxides for constructing ionic conductors, including (1) larger ionic radii and (2) more polarizable character of sulfide ions. Generally speaking, crystalline materials should have higher conductivity than the corresponding glasses, if their crystal structures have been well designed for high ionic conduction. However, this is not true for crystalline lithium ionic conductors whose ionic conductivities and electrochemical decomposition potentials are usually lower than glassy materials. To date, only a few materials have been investigated in the crystalline sulfides, such as $Li_3PS_4$, $Li_4SiS_4$, and $Li_4SiS_4$, but showed low conductivities of $10^{-7}$-$10^{-9}$ S/cm at room temperature. In contrast, numerous glass and glass-ceramic sulfides were reported with exceptional ionic conductivity and excellent stability, including binary systems (such as, $Li_2S$—$SiS_2$, $Li_2S$—$P_2S_5$, $Li_2S$—$B_2S_3$, $Li_2S$—$Ga_2S_3$, and $Li_2S$—$GeS_2$), ternary systems (such as $Li_2S$—$P_2S_5$—$B_2S_3$, $Li_2S$—$P_2S_5$—$SiS_2$, $Li_2S$—$P_2S_5$—$GeS_2$, $Li_2S$—$GeS_2$—$ZnS$, and $Li_2S$—$GeS_2$—$Ga_2S_3$, etc.), and even higher orders (such as $Li_2S$—$P_2S_5$—$GeS$—$Al_2S_3$). Kamaya et al. developed a very superior Li conductor using ternary $Li_2S$—$P_2S_5$—$GeS_2$, and the resulting $Li_{10}GeP_2S_{12}$ had a conductivity of $1.2 \times 10^{-2}$ S/cm at room temperature, and demonstrated much better performance than other solid electrolytes and even some liquid organic electrolytes (illustrated in FIG. 29). Replacing costly Ge with inexpensive Sn, more recently, $Li_{10}SnP_2S_{12}$ was synthesized and exhibited a conductivity of $0.7 \times 10^{-2}$ S/cm at 27° C., a glass was fabricated using 30% $Li_2S$-70% $P_2S_5$ with a conductivity of $1.7\times10^{-2}$ S/cm, and $Li_{3.833}Sn_{0.833}As_{0.166}S_4$ was reported as having a conductivity of $1.39\times10^{-3}$ S/cm. All these demonstrated that sulfide-based inorganic compounds could realize superionic conductivity over traditional electrolytes in a voltage window from 0 to 5 V.

Superionic sulfide-based solid state inorganic electrolytes using ALD have the following benefits: low cost, high thermal, chemical, and electrochemical stability, and robust mechanical properties. Applications include medical services, MEMS, microelectronics, portable electronics (e.g., laptops, cameras, and cell phones), and electric vehicles.

The development of superionic sulfide-based solid state inorganic electrolytes using ALD involves many stages including: development of individual binary sulfides, combination of multiple binary sulfides for higher order compounds of electrolytes, measurements of conductivities of sulfide-based compounds and composition adjustments, and electrochemical testing for high battery performance. $Li_2S$ and $Ga_2S_3$ developed using ALD and described above, and are important components for fabricating superionic inorganic electrolytes. More importantly, $Li_2S$ is an essential part for superionic inorganic compounds as Li source. Besides $Li_2S$ and $Ga_2S_3$, several more binary sulfides are developed for achieving ultimate inorganic electrolytes. Based on references, $P_2S_5$, $Al_2S_3$, $SnS_2$, and $GeS_2$ are very promising components for superionic sulfide-based compounds.

It is also feasible to combine two or more individual ALD systems for higher orders of compounds. In FIG. 30, the preparation of adjustable $Li_x$—$Ga_y$-$S_{x+y}$ compounds using individual Li—S and Ga—S ALD systems is illustrated. Solid electrolytes developed by combining two or more individual ALD binary sulfides together may include at $xLi_2S$-$yP_2S_5$, $xLi_2S$-$yP_2S_5$-$zGeS_2$, $xLi_2S$-$yP_2S_5$-$zGa_2S_3$, and $xLi_2S$-$yP_2S_5$-$zAl_2S_3$, etc. As is well-known, the conductivities of solid inorganic electrolytes are highly dependent on their compositions and material structures. In this way, ALD has exceptional flexibility in combining multiple individual ALD systems for optimal composition and it also is exclusively capable of tuning elemental rations at the atomic scale.

The solid state electrolytes and protective electrode coatings described above may be assembled in batteries, for example, bulk-type and thin-film batteries. The former aims at scaling up the ALD route for large battery systems while the latter has its applications in electronics and semiconductors.

One of the advantages of using ALD for manufacturing the solid state electrolytes describe above is that it affords the capability to infiltrate porous electrode materials to provide excellent contact. In addition, the nm thickness control enables the use of thin, precise electrolyte layers that can provide a very high conductivity compared to conventional bulk electrolyte films that are much thicker. The solid state electrolytes may be applied to all structures (i.e., porous and non-porous structures). The solid state electrolytes may be used for both solid-state and conventional liquid electrolyte Li batteries since the solid-state electrolytes can be applied as a thin film over the electrodes, and then immersed into a liquid electrolyte. Moreover, the solid state electrolytes may be used for thin film batteries. The solid state electrolytes do not include phosphorus containing compounds.

The construction and arrangements of the solid state electrolytes and protective electrode coatings, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed:

1. A method for using atomic layer deposition to produce a film configured for use in an anode, cathode, or solid-state electrolyte of a lithium-ion battery or a lithium-sulfur battery, the method comprising:

repeating a cycle for a predetermined number of times in an inert atmosphere, the cycle comprising:
exposing a substrate to a first precursor;
purging the substrate with inert gas;
exposing the substrate to a second precursor; and
purging the substrate with inert gas,
wherein the film comprises a metal sulfide, and
wherein the first precursor is selected from one of the following groups:
1) the group consisting of: lithium tert-butoxide, lithium acetylacetonate, 2,2,6,6-Tetramethyl-3,5-heptanedionato lithium, lithium cyclopentadienide, lithium pentamethylcyclopentadienide, and lithium 2-methyl-2-butoxide,
2) the group consisting of: hexakis(dimethylamido) digallium, hexakis(diethylamido)digallium, hexakis (ethyl-methylamido)digallium, gallium(III) acetylacetonate, tris(2,2,6,6-tetramethyl-3,5-heptanedionato) gallium(III), gallium(III) hexafluoroacetylacetonate, and trimethylgallium, or
3) the group consisting of: tris(dimethylamido)aluminum, tris(dimethylamido)aluminum, tris(diethylamido)aluminum, tris(ethyl-methylamido)aluminum, aluminum(III) acetylacetonate, tris(2,2,6,6-tetramethyl-3,5-heptanedionato)aluminum(III), aluminum (III) hexafluoroacetylacetonate, and trimethylaluminum.

2. The method of claim 1, wherein the second precursor is hydrogen sulfide.

3. The method of claim 2, wherein exposing the substrate to hydrogen sulfide comprises delivering 1% hydrogen sulfide pressure pulses of ~0.2 Torr using at least one needle valve.

4. The method of 1, wherein exposing the substrate to the first precursor comprises heating a solid form of the first precursor in a reservoir prior to exposure and diverting inert gas through the reservoir while exposing the substrate to the first precursor.

5. The method of claim 4, wherein the inert gas comprises ultrahigh purity inert gas having a purity of 99.999%.

6. The method of claim 1, wherein a duration of each exposing step and purging step of the cycle is 5 seconds.

7. The method of claim 1,
wherein the film is lithium sulfide and the first precursor is selected from the group consisting of: lithium tert-butoxide, lithium acetylacetonate, 2,2,6,6-Tetramethyl-3,5-heptanedionato lithium, lithium cyclopentadienide, lithium pentamethylcyclopentadienide, and lithium 2-methyl-2-butoxide, and
wherein a temperature at each step of the cycle is between 150-300° C.

8. The method of claim 1, wherein the substrate is selected from the group consisting of Si(100), fused silica, micromachined Si trench wafers, copper foils, graphite particles, graphite laminates, $Al_2O_3$, and a combination thereof.

9. The method of claim 1,
wherein the film is gallium sulfide and the first precursor is selected from the group consisting of: hexakis(dimethylamido)digallium, hexakis(diethylamido)digallium, hexakis(ethyl-methylamido)digallium, gallium (III) acetylacetonate, tris(2,2,6,6-tetramethyl-3,5-heptanedionato)gallium(III), gallium(III) hexafluoroacetylacetonate, and trimethylgallium, and
wherein the substrate is selected from the group consisting of Si wafers, fused silica, micromachined Si trenches, capillary glass arrays, copper foils, $ZrO_2$ nanopowder and a combination thereof.

10. The method of claim 1, wherein a temperature at each step of the cycle is between 125-225° C.

11. The method of claim 1, further comprising depositing the gallium sulfide film on a single-walled carbon nanotube powder to form a nano-composite material comprised of a conductive carbon core encapsulated by a uniform and conformal, amorphous, $GaS_x$ shell.

12. The method of claim 11, wherein the cycle is repeated 50-150 times to produce a film with a thickness of 2.5 to 11.1 nm.

13. A method for using atomic layer deposition to produce a film configured for use in an anode, cathode, or solid-state electrolyte of a lithium-ion battery or a lithium-sulfur battery, the method comprising:
alternately repeating a first cycle and a second cycle for a predetermined number of times in an inert atmosphere,
wherein the first cycle comprises:
exposing a substrate to a first precursor,
purging the substrate with inert gas,
exposing the substrate to a second precursor, and
purging the substrate with inert gas,
wherein the second cycle comprises:
exposing the substrate to a third precursor different than the first precursor,
purging the substrate with inert gas,
exposing the substrate to a fourth precursor,
purging the substrate with inert gas, and
wherein the film comprises a metal sulfide.

14. The method of claim 13, wherein
the film is $Li_xAl_yS_z$;
the first precursor is selected from the group consisting of: lithium tert-butoxide, lithium acetylacetonate, 2,2,6,6-Tetramethyl-3,5-heptanedionato lithium, lithium cyclopentadienide, lithium pentamethylcyclopentadienide, and lithium 2-methyl-2-butoxide;
the second precursor is hydrogen sulfide;
the third precursor is selected from the group consisting of: tris(dimethylamido)aluminum, tris(dimethylamido) aluminum, tris(diethylamido)aluminum, tris(ethyl-methylamido)aluminum, aluminum(III) acetylacetonate, tris(2,2,6,6-tetramethyl-3,5-heptanedionato) aluminum(III), aluminum(III) hexafluoroacetylacetonate, and trimethylaluminum; and
the fourth precursor is hydrogen sulfide.

15. The method of claim 14, wherein the first precursor is lithium tert-butoxide and the third precursor is tris(dimethylamido)aluminum.

16. The method of claim 13, wherein
the film is $Li_xGa_yS_z$;
the first precursor is selected from the group consisting of: lithium tert-butoxide, lithium acetylacetonate, 2,2,6,6-Tetramethyl-3,5-heptanedionato lithium, lithium cyclopentadienide, lithium pentamethylcyclopentadienide, and lithium 2-methyl-2-butoxide;
the second precursor is hydrogen sulfide;
the third precursor is selected from the group consisting of: hexakis(dimethylamido)digallium, hexakis(diethylamido)digallium, hexakis(ethyl-methylamido)digallium, gallium(III) acetylacetonate, tris(2,2,6,6-tetramethyl-3,5-heptanedionato)gallium(III), gallium(III) hexafluoroacetylacetonate, and trimethylgallium; and
the fourth precursor is hydrogen sulfide.

17. The method of claim 16, wherein the first precursor is lithium tert-butoxide and the third precursor is hexakis (dimethylamido)digallium.

* * * * *